United States Patent
Kumar et al.

(10) Patent No.: US 11,281,963 B2
(45) Date of Patent: Mar. 22, 2022

(54) PROGRAMMABLE NEURON CORE WITH ON-CHIP LEARNING AND STOCHASTIC TIME STEP CONTROL

(71) Applicant: INTEL CORPORATION, Santa Clara, CA (US)

(72) Inventors: Raghavan Kumar, Hillsboro, OR (US); Gregory K. Chen, Portland, OR (US); Huseyin Ekin Sumbul, Portland, OR (US); Phil Knag, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 995 days.

(21) Appl. No.: 15/276,111

(22) Filed: Sep. 26, 2016

(65) Prior Publication Data
US 2018/0089557 A1    Mar. 29, 2018

(51) Int. Cl.
G06N 3/04    (2006.01)
G06N 3/063    (2006.01)
G06N 3/08    (2006.01)

(52) U.S. Cl.
CPC ............ G06N 3/049 (2013.01); G06N 3/063 (2013.01); G06N 3/088 (2013.01)

(58) Field of Classification Search
CPC ......... G06N 3/049; G06N 3/063; G06N 3/088
See application file for complete search history.

(56) References Cited

U.S. PATENT DOCUMENTS 7,571,200 B2 *   8/2009   Shackleford ............ G06F 7/582
                                                   708/250
7,904,398 B1 *   3/2011   Repici ...................... G06N 3/08
                                                   706/15
(Continued)

FOREIGN PATENT DOCUMENTS

WO    2017/172174 A1    10/2017

OTHER PUBLICATIONS

Huyck, Christian R. and Belavkin, Roman V. (2006) Counting with neurons: rule application with nets of fatiguing leaking integrate and fire neurons. In: 7th International Conference on Cognitive Modelling, Apr. 5-8, 2006., Trieste, Italy. (Year: 2006).*

(Continued)

*Primary Examiner* — Eric Nilsson
(74) *Attorney, Agent, or Firm* — Nicholson De Vos Webster & Elliott LLP

(57) ABSTRACT

An integrated circuit (IC), as a computation block of a neuromorphic system, includes a time step controller to activate a time step update signal for performing a time-multiplexed selection of a group of neuromorphic states to update. The IC includes a first circuitry to, responsive to detecting the time step update signal for a selected group of neuromorphic states: generate an outgoing data signal in response to determining that a first membrane potential of the selected group of neuromorphic states exceeds a threshold value, wherein the outgoing data signal includes an identifier that identifies the selected group of neuromorphic states and a memory address (wherein the memory address corresponds to a location in a memory block associated with the integrated circuit), and update a state of the selected group of neuromorphic states in response to generation of the outgoing data signal.

22 Claims, 16 Drawing Sheets

(56) References Cited

U.S. PATENT DOCUMENTS

| | | | |
|---|---|---|---|
| 9,442,726 B1* | 9/2016 | Bonanno | G06F 9/3844 |
| 10,387,774 B1* | 8/2019 | Cao | G06N 3/049 |
| 2010/0299297 A1 | 11/2010 | Breitwisch et al. | |
| 2012/0011090 A1 | 1/2012 | Tang et al. | |
| 2012/0036099 A1 | 2/2012 | Venkatraman et al. | |
| 2012/0259804 A1* | 10/2012 | Brezzo | G06N 3/063 706/25 |
| 2013/0073491 A1* | 3/2013 | Izhikevich | G06N 3/049 706/15 |
| 2013/0325776 A1 | 12/2013 | Ponulak et al. | |
| 2014/0032458 A1 | 1/2014 | Sinyavskiy et al. | |
| 2014/0180984 A1* | 6/2014 | Arthur | G06N 3/02 706/15 |
| 2014/0351190 A1 | 11/2014 | Levin et al. | |
| 2014/0358834 A1 | 12/2014 | Kim et al. | |
| 2014/0365416 A1 | 12/2014 | Kim et al. | |
| 2015/0039546 A1* | 2/2015 | Alvarez-Icaza | G06N 3/0472 706/27 |
| 2015/0046382 A1 | 2/2015 | Rangan | |
| 2015/0106316 A1* | 4/2015 | Birdwell | G06F 16/22 706/33 |
| 2018/0075344 A1* | 3/2018 | Ma | G06F 7/026 |

OTHER PUBLICATIONS

Walter, Florian & Röhrbein, Florian & Knoll, Alois. (2015). Neuromorphic implementations of neurobiological learning algorithms for spiking neural networks. Neural Networks. 72. 10.1016/j.neunet.2015.07.004. (Year: 2015).*

B. U. Pedroni et al., "Mapping Generative Models onto a Network of Digital Spiking Neurons," in IEEE Transactions on Biomedical Circuits and Systems, vol. 10, No. 4, pp. 837-854, Aug. 2016. (Year: 2016).*

P. Chen et al., "Mitigating effects of non-ideal synaptic device characteristics for on-chip learning," 2015 IEEE/ACM International Conference on Computer-Aided Design (ICCAD), (Year: 2015).*

Emre Neftci, Srinjoy Das, Bruno Pedroni, Kenneth Kreutz-Delgado, Gert Cauwenberghs, "Event-driven contrastive divergence for spiking neuromorphic systems", frontiers in neuroscience, vol. 7, article 272, pp. 1-14,Jan. 2014 (Year: 2014).*

Cruz-Albrecht et al., "A Scalable Neural Chip with Synaptic Electronics using CMOS Integrated Memristors," IOP Publishing, Nanotechnology 24, 11 pages, 2013.

International Search Report and Written Opinion for PCT Application No. PCT/US2017/048501, 16 pages, dated Dec. 8, 2017.

International Search Report and Written Opinion for PCT Application No. PCT/US2017019860, 9 pages, dated Jul. 13, 2017.

Legenstein et al., "A Learning Theory for Reward-Modulated Spike-Timing-Dependent Plasticity with Application to Biofeedback," PLoS Computational Biology, vol. 4, Issue 10, e 1000180, 27 pages, Oct. 10, 2008.

Qiao et al. "A reconfigurable On-Line Learning Spiking Neuromorphic Processor Comprising 256 Neurons and 128k Synapses", Front. Neurosci. 9:141, www.frontiersin.org, 17 pages, Apr. 29, 2015.

Seo et al., "A 45nm CMOS Neuromorphic Chip with a Scalable Architecture for Learning in Networks of Spiking Neurons," Custom Integrated Circuits Conference (CICC), 978-1-4577-0223-5/11 IEEE, 4 pages, copyright 2011.

Friedmann et al., "Reward-Based Learning Under Hardware Constraints—Using a RISC Processor Embedded in a Neuromorphic Substrate," Frontiers in Neuroscience, vol. 7, article 160, pp. 1-17, Sep. 2013.

Dytckov et al., "Efficient STDP Micro-Architecture for Silicon Spiking Neural Networks," 17th Euromicro Conference on Digital System Design, pp. 496-503, 2014.

Legenstein et al., "Theoretical Analysis of Learning with Reward-Modulated Spike-Timing-Dependent Plasticity," 9 pages, 2008.

Gardner et al., "Learning to Map Input-Output Spike Patterns by Reward-Modulated STDP," ICANN2014, 143 V1, 8 pages, 2014.

Jin et al., "Implementing Spike-Timing-Dependent Plasticity on SpiN Naker Neuromorphic Hardware," International Joint Conference on Neural Networks (IJCNN), 9, pages, Jul. 2010.

International Preliminary Report on Patentability, PCT App. No. PCT/US2017/048501, dated Apr. 4, 2019, 15 pages.

* cited by examiner

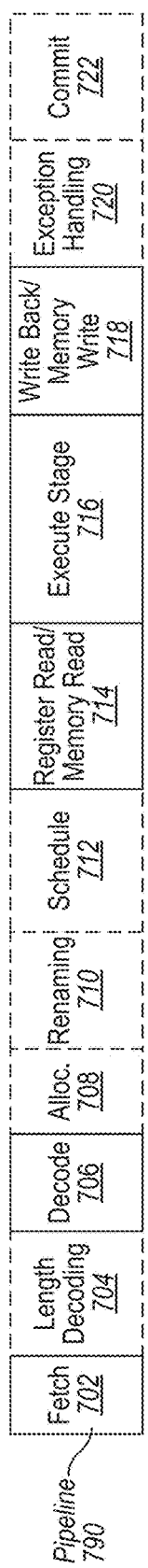
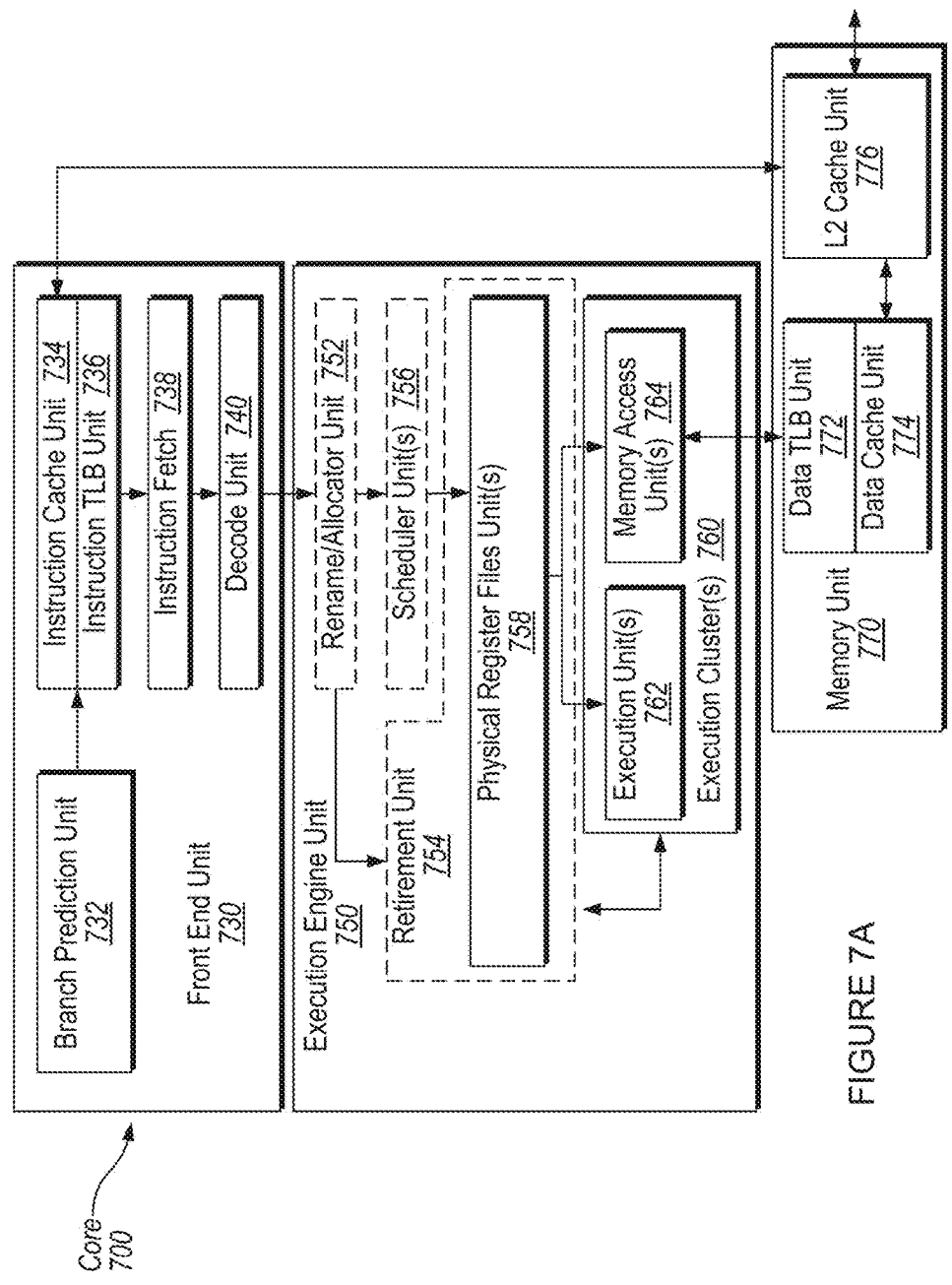
FIGURE 7B
FIGURE 7A

PROGRAMMABLE NEURON CORE WITH ON-CHIP LEARNING AND STOCHASTIC TIME STEP CONTROL

The present disclosure relates to the field neuromorphic computing and, in particular, to a system with computation blocks capable of real-time signal integration, time step control, and learning.

BACKGROUND

Neuron groups represent a core computation block in a neuromorphic computing system. The term "neuromorphic" refers to electronic circuitry designed to mimic neuro-biological architectures present in nervous systems to, in part, overcome parallel computation bottlenecks in machine learning systems. These systems are designed to process sensory data such as images and sounds and to respond to changes in data in ways not specifically programmed into the system. A "neuron" in a neuromorphic computing system is a computation sub-block of the core computation block and includes an associated memory block, which is sometimes called a synapse or synaptic memory.

BRIEF DESCRIPTION OF THE DRAWINGS

FIG. 7A is a block diagram illustrating an in-order pipeline and a register renaming stage, out-of-order issue/execution pipeline according to one embodiment.

FIG. 7B is a block diagram illustrating a micro-architecture for a processor that may perform operations of the computation block of FIGS. 1B and 3.

DESCRIPTION OF EMBODIMENTS

Figure 1A:
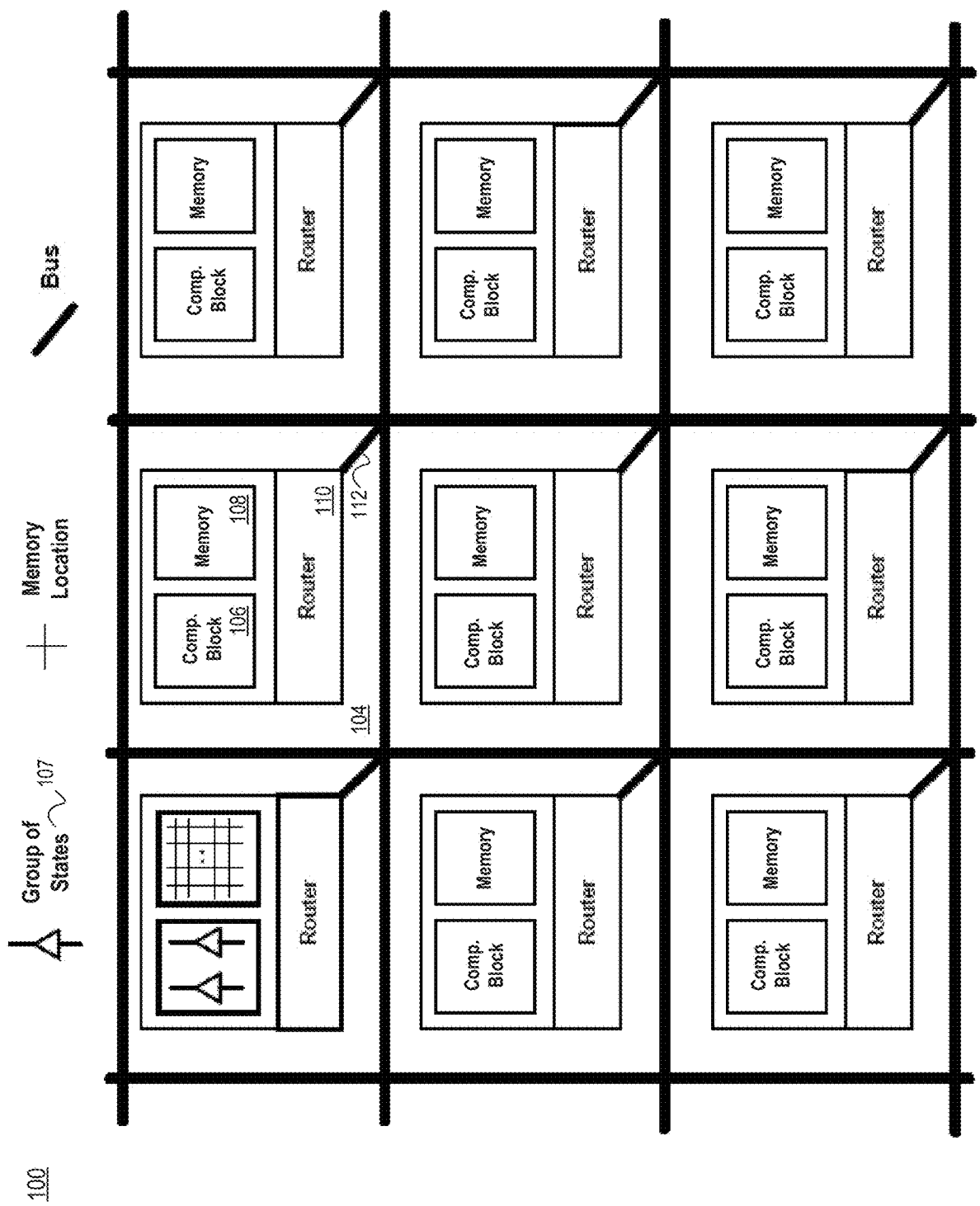
FIG. 1A is a block diagram of a neuromorphic computing system, according to an embodiment of the present disclosure.

An artificial neural network (ANN) is a network of processing devices modeled after biological neural networks (the central nervous systems of animals, in particular the brain) that are used to estimate or approximate functions that can depend on a large number of inputs that are generally unknown. An ANN may be organized in layers. The layers may include a number of interconnected nodes that contain an activation function, such as logic that triggers activation of nodes in a certain order. A pattern (e.g., of an image, a sound, or the like) may be presented to the ANN via an input layer, which communicates to one or more processing layers (referred in the art as hidden layers) where the actual processing is done via a system of weighted connections, e.g., that include connection weights. Connection weights are values that define connections between nodes according to learning logic, as the ANN develops an identification of the input pattern. The processing layers may link to an output layer where the result is output to an output node. The learning logic may, therefore, modify the weights of the connections according to previous learning applied to the input pattern. In a sense, the ANN may learn by example, e.g., learn to recognize an object or sound based on similarities of that object or sound to prior learned known objects or sounds.

A neuromorphic computing system (hereinafter "system") maps different ANN topologies as dictated by application and workload demands. An ANN topology refers to the way nodes of an ANN are interconnected and through which data flows (e.g., a feedforward neural network, different kinds of radial basis functions (RBF) networks, or the like). To perform this mapping to an ANN topology, the system endeavors to adapt the parameters driving these systems such as to achieve the best possible performance. These parameters refer to the various factors that impact the arithmetic computations within a neuron block. Achieving the best possible performance within a system, however, becomes more difficult if the system incorporates an on-chip learning circuit to accelerate a training process, also known as machine learning (hereinafter "learning"). The performance suffers because of the increased complexity of the logic required to perform the learning as well as the interaction between neuron parameters and connection weights. Learning may be performed by using on-chip learning algorithm(s) to update a weight associated with a computation sub-block in response to an incoming data signal, as will be explained in more detail. The updated weight is stored back into an associated memory block. The updated weight may then be transmitted across an ANN to fan-out-connected computation blocks, e.g., independent processing circuitry known in the art as neurons.

In various embodiments, some systems either offload the training process to off-chip training algorithms and/or restrict the reconfigurability of computation sub-blocks, in terms of parameters driving the computations and different variants of learning algorithms, to cater to a small subset of workloads. A workload refers to application data run on a neuromorphic system such as a set of images being processed for computer vision. Because the parameters drive the activities of a computation sub-block (as will be discussed in more detail) and the variant of a learning algorithm may depend on these parameters, facilitating reconfigurability of these parameters and variants of learning algorithms to cater to a large subset of workloads increases the reach and usefulness of the training process. Furthermore, some systems adopt a fixed time step control, which disables real-time spike integration that is often found in biological neural networks, thus limiting performance of these systems because the learning cannot be performed in real time. The term "time step" refers to a period of time defined by a certain number of clock cycles. The term "spike," making analogy to an action potential in biological systems, refers to a data signal that identifies a computation block, and will be referred to hereinafter as a "data signal" or just "signal" for simplicity of discussion.

The present disclosure introduces an architecture in which a computation block is shared across multiple groups of neuromorphic states (herein "states"), where each group of neuromorphic states is comparable to a neuron in a neuromorphic computing system. (Recall that the neuron herein is referred to as a computation sub-block, so the computation block performs operations of multiple neurons, each represented by a group of states.) In one embodiment, these neuromorphic states are parameters that define a computation sub-block of the computation block that impact timing of generation of outgoing signals and integration of incoming data signals, as well as when and how a learning operation occurs (according to the learning algorithm the computation block is executing for the current ANN). These parameters may include, for example, parameters such as membrane potential, counters, control bits, spike threshold, spike rate, and the like. The computation block may be, for example, an integrated circuit core or processor.

In one embodiment, the computation block may perform spike-timing dependent plasticity (STDP)-based learning. STDP is a temporally asymmetric form of Hebbian learning induced by tight temporal correlations between the spikes of pre-synaptic and post-synaptic neurons. A pre-synaptic neuron is a neuron that sends an output spike to its fan-out connected neurons that are weighted through connection weights. A post-synaptic neuron is a neuron that receives the spike and associated weights from its fan-in connected neurons (pre-synaptic neurons). If a pre-synaptic neuron spikes earlier than a post-synaptic neuron, then the likelihood that the pre-synaptic spike induced the spiking activity of post-synaptic neuron is high. In contrast, the pre-synaptic spikes happening later than a post-synaptic spike has an anti-causal relationship as the pre-synaptic spikes do not contribute to the post-synaptic neuron's spiking activity. Thus, inputs that might be the cause of the post-synaptic neuron's excitation are made even more likely to contribute in the future, whereas inputs that are not the cause of the post-synaptic spike are made less likely to contribute in the future. Noting these correlations makes up the learning process, which continues until a subset of the initial set of connections remain, while the influence of all others is reduced to zero through updating of connection weights. Since a neuron produces an output spike when many of its inputs occur within a brief period, the subset of inputs that remain are those that tended to be correlated in time. In addition, since the inputs that occur before the output are strengthened, the inputs that provide the earliest indication of correlation may eventually become the final input to the neuron.

The disclosed computation block may also include local storage of parameters that may be changed, to provide for a level of programmability that defines an optimization space in the functions of updating states and performing learning. In other words, the optimization space may be made up of parameters of functions used by the computation block to update neuromorphic states and perform learning through updating of connection weights as will be discussed in detail. The system embodying the disclosed computation block may provide for search of the optimization space for operation points (e.g., network-based parameters) that improve performance metrics. Such performance metrics may include classification accuracy of an ANN, convergence rate, energy expended per operation, efficiency, and the like.

In one embodiment, the disclosed computation block includes a register set to store the multiple groups of states. The computation block may further implement a time step controller that facilitates real-time signal integration, e.g., without the need to store or buffer data signals. The computation block may also help to reduce power consumption of register set (RS) accesses by dividing a data path into circuitry of a signal-activated data path and of a time-step-activated data path. The time step controller may include a stochastic aspect, e.g., the generation of time step update signals in a way that provides a pseudo-random probability distribution of signal generation across computation blocks of the disclosed system. In this way, the computation block may pseudo-randomly generate outgoing data signals within a programmable time step window, and integrate incoming data signals in real-time, thereby improving the performance and introducing stochastic memory update operations that improve generalization and flexibility of training.

In one embodiment, the time step controller of the computation block may activate a time step update signal. The time step update signal may be used for time-multiplexed selection of a group of states to update and for which to generate an outgoing data signal. In one example, the time step controller activates the time update signal stochastically as will be discussed. The group of states may be stored in a register set of the computation block.

The computation block may further include a first circuitry that covers the time-step-activated data path. The first circuitry may, responsive to detecting the time step update signal for a selected group of states, generate an outgoing data signal in response to determining that a first membrane potential of the selected group of states exceeds a threshold value, and update at least some states of the selected group of states in response to generation of the outgoing data signal. A membrane potential is an accumulation value (u) of all its weighted data signals collected over all the previous time-steps that the first circuitry may update during a time step update period, e.g., depending on an amount of an input data value (such as a pixel, sound frame, or other data value being processed by the system). A membrane potential of computation block is comparable to membrane voltage observed in biological cells, which indicates the difference in potential between interior and exterior portions of the cell. The membrane potential may be used in determining whether a given group of states will generate a possible output signal. The outgoing data signal may include an identifier and a memory address associated with the selected group of states to indicate its fan-out connected computation blocks.

The memory address of the outgoing data signal may point to a location in the associated memory block where a weight value is stored for the selected group of states. This weight value is the connection weight for an ANN, as discussed previously, which may be used for learning. This weight value may then be sent out to corresponding fan-out connections in the ANN and may be added to the membrane potential stored in the register set. Furthermore, various counters that are part of the states of the selected group of states may be reset upon generation of the outgoing data signal. These counters may, for example, ensure spreading out the timing of the outgoing data signal generation and of performance of learning for the selected group of states, as will be explained in more detail.

In one embodiment, the computation block may further include a second circuitry that covers the signal-activated data path. The second circuitry may, responsive to the time step update signal being low (e.g., undetected) and to receipt of an incoming data signal corresponding to a second group of states, add a weight value of the incoming data signal to a second membrane potential of the second group of states, to generate an updated second membrane potential. The updated second membrane potential may be stored in the register set, replacing the second membrane potential. In this way, states associated with incoming data signals may be updated during a time that an outgoing data signal is not generated. This timing may avoid potential conflicts of simultaneously updating and accessing the membrane potential for any given group of states.

In one embodiment, the computation block may further include a learning unit to perform a learning operation on the second group of states, in conjunction with the updates to the second membrane potential. A learning operation as referred to herein is a process by which a weight value for a group of neuromorphic states is updated and replaced in memory. The learning unit may perform this learning operation, in part, by identifying the second group of states corresponding to an identifier associated with the incoming data signal, and updating a weight value of the incoming data signal, to generate an updated weight value to be provided to a router for storage in the associated memory block at a second memory address associated with the second group of states. The learning operation, therefore, is the execution of the computation block's portion of the STDP learning algorithm being applied across the ANN.

FIG. 1A is a block diagram of a neuromorphic computing system 100 (hereinafter system 100), according to an embodiment of the present disclosure. The system 100 may include a plurality of computation sub-systems 104, where the depicted system 100 includes only nine computation sub-systems for exemplary purposes. Each computation sub-system 104 may further include a computation block 106 (which may be a core or processor, for example), a memory block 108 coupled to the computation block 106, and a router 110 coupled to both the computation block 106 and the memory block 108. The router 110 may also be coupled to a communication network bus 112 that may communicate with other computation blocks, e.g., so that weights updated in the memory block 108 may be sent to fan-out-connected computation blocks. Fan-out computation blocks are those to which weights of the computation block are to be sent according to the present ANN topology. According to an embodiment, the computation block 106 includes multiple groups of states 107 and the memory block 108 includes rows of memory locations (also called synapses in the art) that are each associated with a group of states.

Figure 1B:
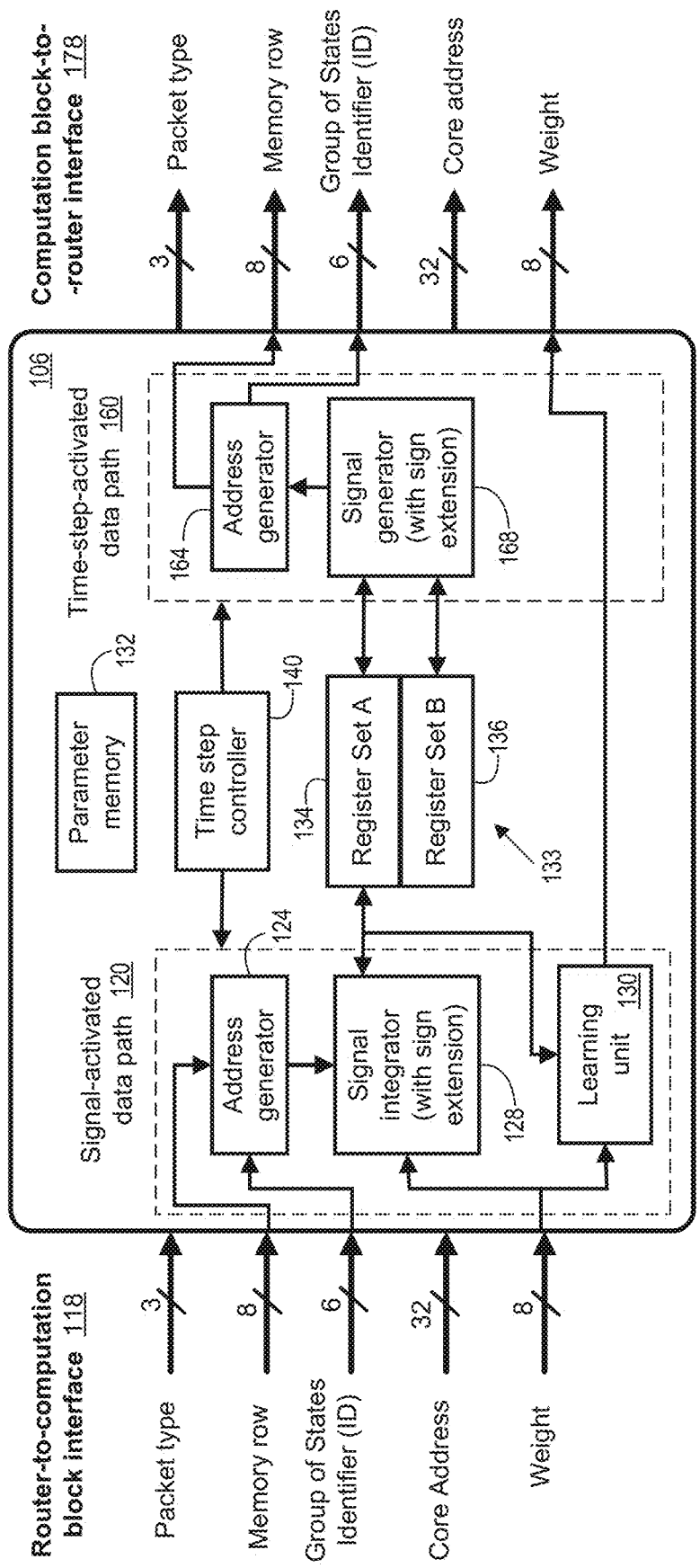
FIG. 1B is a block diagram of a computation block of the neuromorphic computing system of FIG. 1A, according to an embodiment of the present disclosure.

FIG. 1B is a block diagram of a computation block 106 of the system 100 of FIG. 1A, according to an embodiment of the present disclosure. The computation block may include a router-to-computation block interface 118, a signal-activated data path 120, a time-step activated data path 160, and a computation block-to-router interface 178. The computation block may further include a parameter memory 132, a register set 133 including separate register set A 134 and register set B 136, and a time step controller 140. In one embodiment, the signal-activated data path 120 includes an address generator 124, a signal integrator 128 that includes sign extension capability, and a learning unit 130. The time-step activated data path 160 may include an address generator 164 and a signal generator 168 that includes sign extension capability.

In one embodiment, the register set 124 is at least as deep in entry lines as there are number of groups of states (e.g., neurons) in the computation block 106. Furthermore, by splitting the register set 133 into register set A 134 and register set B 136, the register set design minimizes power consumption because states stored in the register set B 136 are not accessed during signal integration and learning operations as will be discussed.

The router-to-computation block interface 118 may include ports to receive different types of incoming data and addresses, which may include, for example: packet type, memory row (in the memory block 108), an identifier (ID) of group of states, a core address, and an incoming weight. The computation block-to-router interface 178 may include corresponding ports for outgoing data and addresses. More particularly, the packet type may refer to a type of signal event such as, for example, signal integration, learning, time step control, and the like. The memory row may refer to a row in the memory block 108 associated with the computation block 106. A memory address for a group of states may be mapped to the memory row, for example. The ID for the group of states may be located within incoming and outgoing data signals, which the computation block may use to identify incoming and outgoing traffic to a particular group of states, for purposes of updating the group of states within the register set 133. The core address may be a location in system memory of the memory block 108 for routing purposes in a multi-core computing system.

The incoming weight may be a value associated with a group of states that is stored at the memory row of the incoming data signal and that will be used for updating states and performing learning. In updating a state, the computation block may add the incoming weight to a membrane potential for the group of states, to update the membrane potential. In performing learning, the learning unit may use the incoming weight as an input in generation of an updated weight value that is stored back into the memory row, replacing the weight for the group of states.

In one embodiment, the signal-activated data path 120 may include circuitry for updating a group of states upon receipt of an incoming data signal, and for performing learning related to the group of states, in response to a time step update signal (generated by the time step controller 140) being low (e.g., not enabled). The address generator 124 may identify an address in the register set for storing the group of states, which is identified by the ID in an incoming data signal. The signal integrator 128 may perform integration of an incoming weight with a membrane potential of a corresponding group of states identified in the incoming data signal, as will be explained with reference to FIGS. 3, 3A.

The learning unit 130 may also use the incoming weight to perform a learning operation that generates an updated weight associated with the group of states, and stores the updated weight back into the memory block 108. This updated weight may then be sent to fan-out-connected computation blocks during subsequent data signal generation, e.g., to update other groups of states according to fan-out connections of an ANN being mapped. The learning unit may be located on-chip within the computation block 106, and may be performed with different variants of STDP rules, depending on reconfigurable parameters stored within the parameter memory 132. Operation of the learning unit 130 will be discussed in more detail with reference to FIG. 6. The parameter memory may also provide reconfigurable parameters for the arithmetic computation portions of the signal-activated data path and the time step-activated data path of the computation block, as will be discussed in more detail with reference to FIGS. 3, 3A, and 3B.

In an embodiment, the time-step activated data path 160 may include circuitry for generation of an outgoing data signal in response to the time step controller 140 activating the time step update signal. The time step update signal may be selective of a group of states stored in the register set. To generate the outgoing data signal, the signal generator 168 may perform a series of operations on the group of states currently being accessed in the register set 133. The series of operations may result in some or all of the states of the group of states being updated, including an update of a membrane potential of the group of states. The address generator 164 may then determine a memory address of the group of states, and map the memory address to a memory row in the memory block 108, where the memory row and an ID of the group of states are made part of the outgoing data signal.

Figure 2:
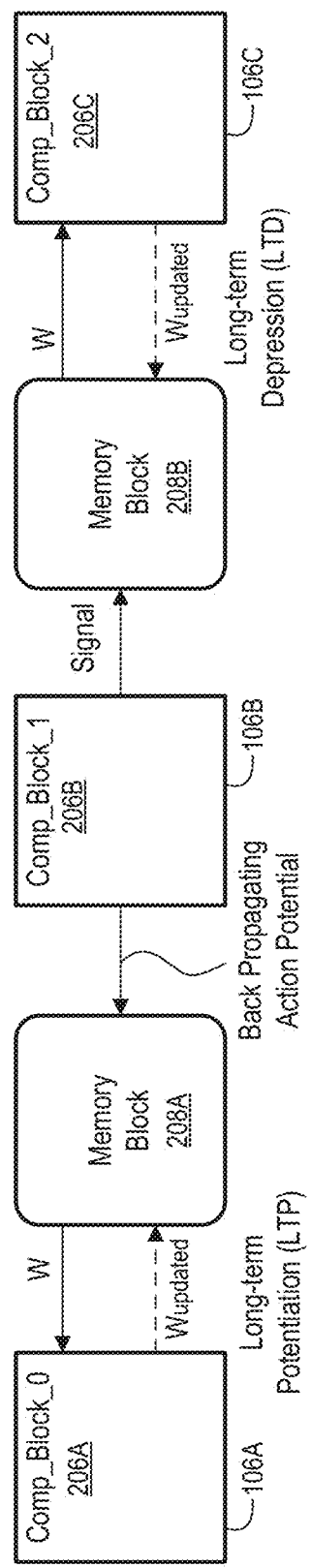
FIG. 2 is a block diagram illustrating interconnectivity of computation blocks, according to an embodiment of the present disclosure.

FIG. 2 is a block diagram illustrating interconnectivity of computation blocks 106, according to an embodiment of the present disclosure. In one embodiment, within a series of computation blocks, there exists a first computation block 206A with an associated first memory block 208A, a second computation block 206B with an associated second memory block B 208B, and a third computation block 206C. As illustrated, the first computation block 206A connects to the second computation block 206B through the first memory block 208A and the third computation block 206C connections to the second computation block 206B through the second memory block 206B.

In the implementation of Spike-timing Dependent Plasticity (STDP) algorithms, presynaptic spike (e.g., pre-store signal) arrival a few milliseconds before post-synaptic spiking event leads to long-term potentiation (LTP) of synapses, where the connection gets strengthened. (As noted herein above, "synapse" refers to a portion of the memory block and "synaptic" refers to the position of the computation-block with respect to its connected computation blocks. For example, computation block 206B acts as pre-synaptic block to computation block 206C, while the computation block 206B acts as post-synaptic block to the computation block 206A.). Furthermore, pre-synaptic spike arrival occurring after postsynaptic spikes leads to long-term depression (LTD) of the same synapse, where the connection gets weakened.

With further reference to FIG. 2, if the first computation block 208A generates an outgoing data signal at time zero (t0) before the second computation block 208B is to generate an outgoing data signal at time t0+2, for example, then there is a high probability that the first computation block 208A will make the second computation block 208B generate the outgoing data signal, perhaps at t0+1, for example. This sequence of operations is known as LTP. In contrast, if the third computation block 206C generates an outgoing data signal before the second computation block 206B generates an outgoing data signal, then the second computation block 206B has no role to play in causing the third computation block 206C to generate its outgoing data signal. This sequence of operations is known as LTD. The change in the memory block as a function of the relative timing of pre- and post-synaptic action potentials is called the STDP function or learning window. The rapid change of the STDP function with the relative timing of generated signals suggests the possibility of temporal coding schemes on a millisecond time scale. Temporal coding refers to storing more information to convey in spike-timing. For example, an input can be defined by precise spike times, instead of the number of spikes needed to represent that input. In such cases, STDP is more useful to implement a learning algorithm. The labeling of a data signal as "LTP" or "LTD" may, therefore, play a role in how the learning is handled as will be discussed in more detail with reference to FIG. 6.

Figure 3:
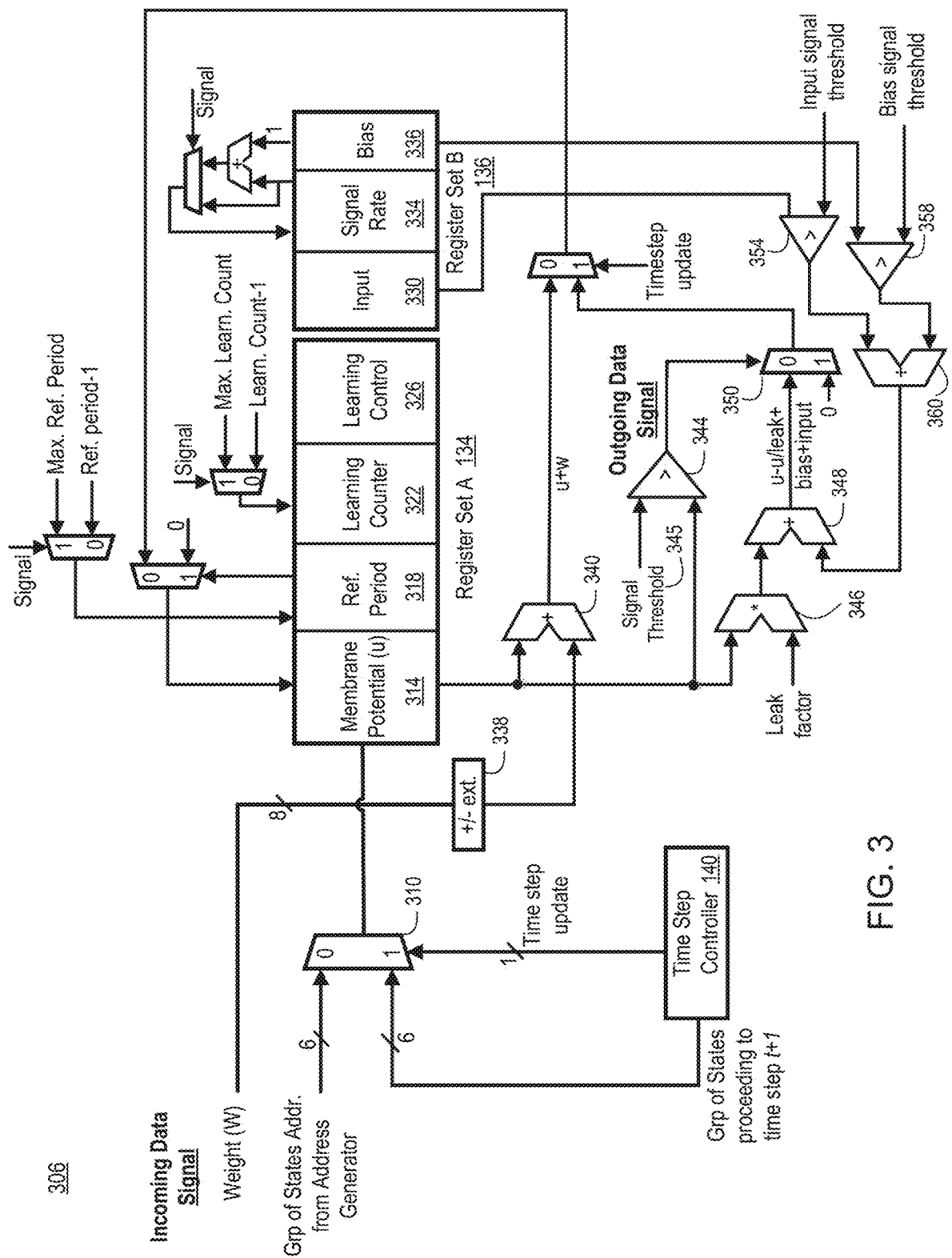
FIG. 3 is a functional block diagram of a portion of the computation block of FIG. 1B, according to an embodiment of the present disclosure.

FIG. 3 is a functional block diagram of a portion 306 of the computation block 106 of FIG. 1B, according to an embodiment of the present disclosure. The portion 306 of the computation block 106 may cover both the signal-activated data path 120 and the time-step activated data path 160. In one embodiment, when the time step controller 140 activates a time step update signal for a next group of states, a multiplexer 310 may select the next group of states proceeding to a time step t+1. The operation of the time step controller 140 in selection of a next group of states to be updated will be discussed in detail with respect to FIG. 4. With the activation of the time step update signal, the time-step activated data path 160 may perform a series of operations to update the group of states selected by the time step update signal, and generate an outgoing data signal, as will be explained in detail with reference to FIG. 3B.

When the time step update signal is low (e.g., a digital zero and thus not detected), however, the multiplexer 310 may instead retrieve an address in the register set 133 for a group of states associated with an identifier of an incoming data signal. In one embodiment, upon receipt of the incoming data signal, the signal-activated data path 120 may perform a series of operations to integrate a weight value of the incoming data signal with a membrane potential for the group of states as will be discussed with reference to FIG. 3B. The signal-activated path 120 may also perform learning by updating an associated weight in the memory block 108 according to one or more STDP learning algorithm(s). The integration of the incoming data signal and the learning operation will be discussed in more detail with reference to FIGS. 3A and 6.

Figure 3A:
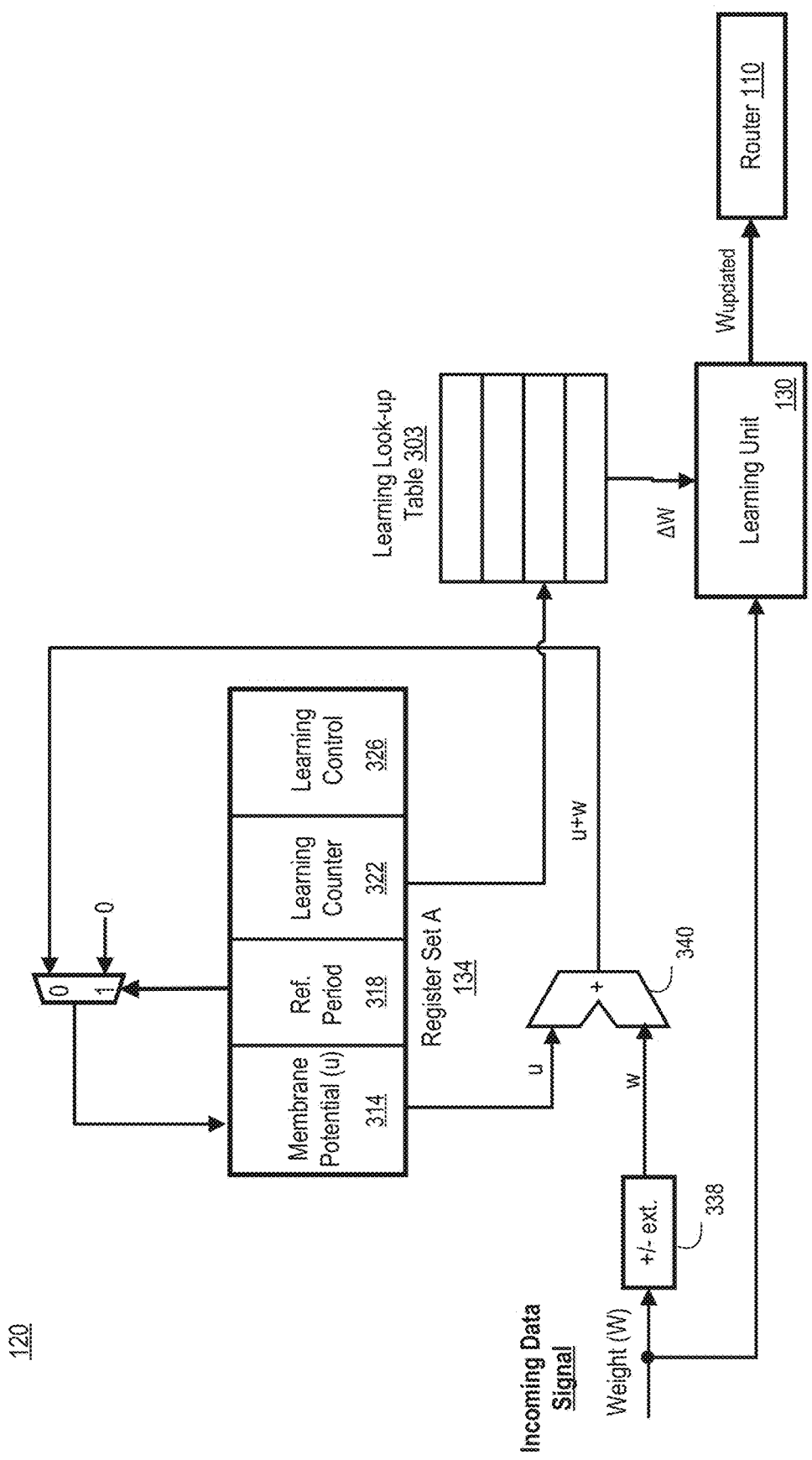
FIG. 3A is a block diagram illustrating a signal-activated path of the computation block of FIG. 3, according to an embodiment of the present disclosure.

With additional reference to FIG. 3A, the signal-activated path 120 may include a learning look-up table 303, and the register set A 134, which may store a membrane potential 314, a refractory period counter 318, a learning counter 322, and a learning control state 326. The learning control state 326 may be a set of bits that specify what kind of learning algorithm the learning unit 130 is to employ. The learning counter 322 may be a set of bits that provides for a time-multiplexed selection of a weight update value to add (or subtract) from an incoming weight value for a group of neuromorphic states, as will be explained in more detail. The signal-activated path 120 may further include a sign extender 338, an adder 340, and the learning unit 130.

In one embodiment, the sign extender 338 may selectively change a sign of the incoming weight (W) depending on whether the ANN uses only positive weights or uses both positive and negative weights. The learning control state 326 may be programmable in one embodiment. The adder 340 may then add the sign-extended weight (w) to the membrane potential (u) 314 of the group of states associated with the incoming data signal, to generate an updated membrane potential. This updated membrane potential may then replace the membrane potential in the register set A 134. The incoming weight (W) may also be sent to the learning unit 130, which is added to a weight update value (Δw) from the learning look-up table 303 to generate an updated weight ($W_{updated}$). The updated weight is sent to the router 110 to be stored the memory block 108 at a row associated with the group of states. The operations of the learning unit 130 will be discussed in more detail with reference to FIG. 6.

Figure 3B:
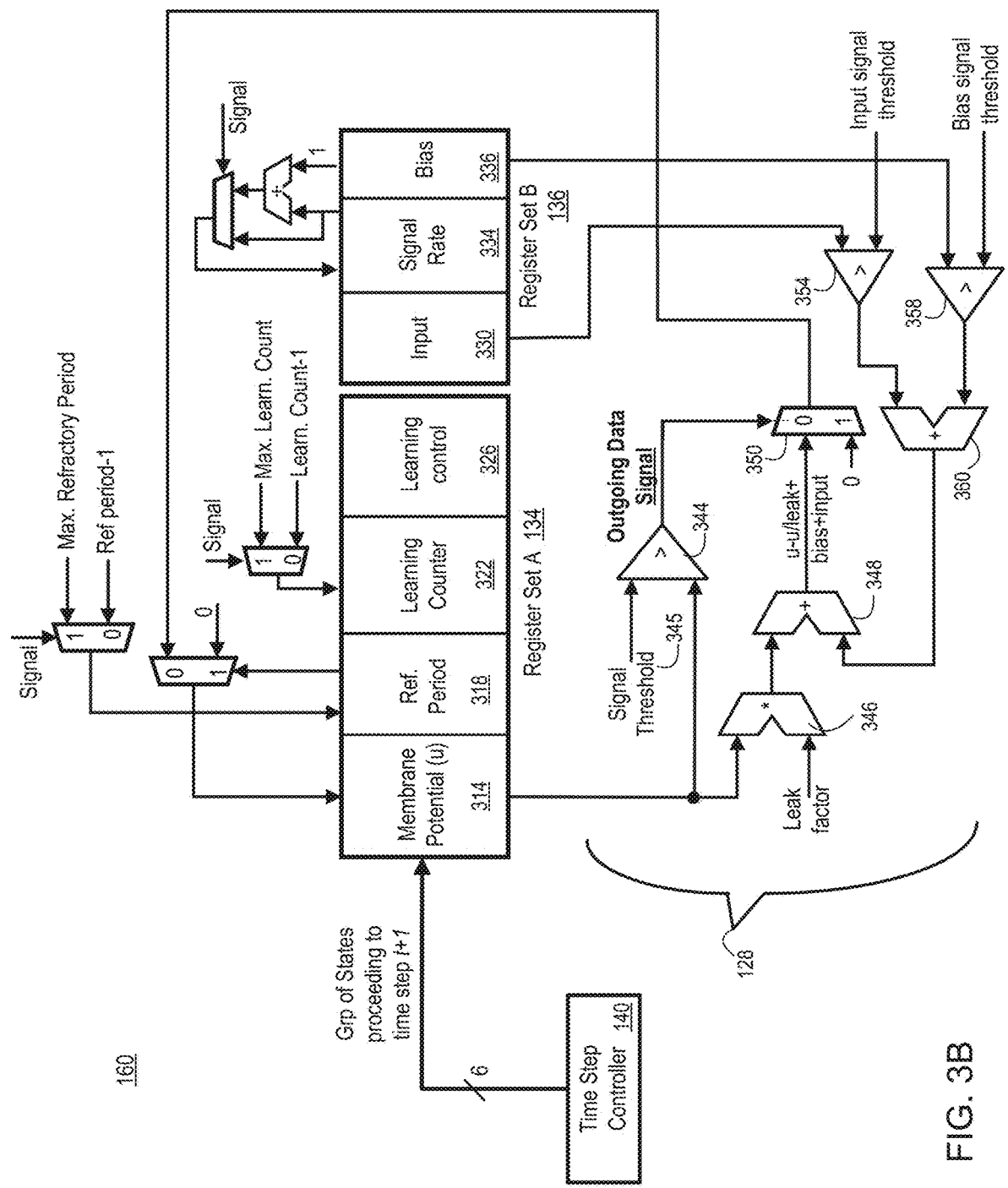
FIG. 3B is a block diagram illustrating a time-step-activated path of the computation block of FIG. 3, according to an embodiment of the present disclosure.

In one embodiment, integration of the incoming weight will not occur if the refractory period counter 318 is non-zero. This refractory period counter 318 is reset to a maximum counter value (e.g., a maximum refractory period) upon generation of an outgoing data signal, as illustrated in FIG. 3B, and is decremented upon passage of each time step until reaching zero. The time during which the refractory period counter 318 is being decremented provides a delay of a number of time steps between which the group of states undergo signal generation until signal integration may again be performed. The maximum refractory period may be programmable, and thus this delay period may be adjusted.

With additional reference to FIG. 3B, the time step-activated data path 160 may include the time step controller 140, the register set A 134, the register set B 136, and the signal integrator 128. The register set A 134 may store the membrane potential 314, the refractory period counter 318, the learning counter 322, and the learning control state 326. The register set B 136 may store an input data value 330, a signal rate 334, and a bias value 336. In one embodiment, the signal integrator 128 may include a comparator 344, a multiplier 346, a second adder 348, a second multiplexer 350, a second comparator 354, and a third comparator 358.

Figure 4:
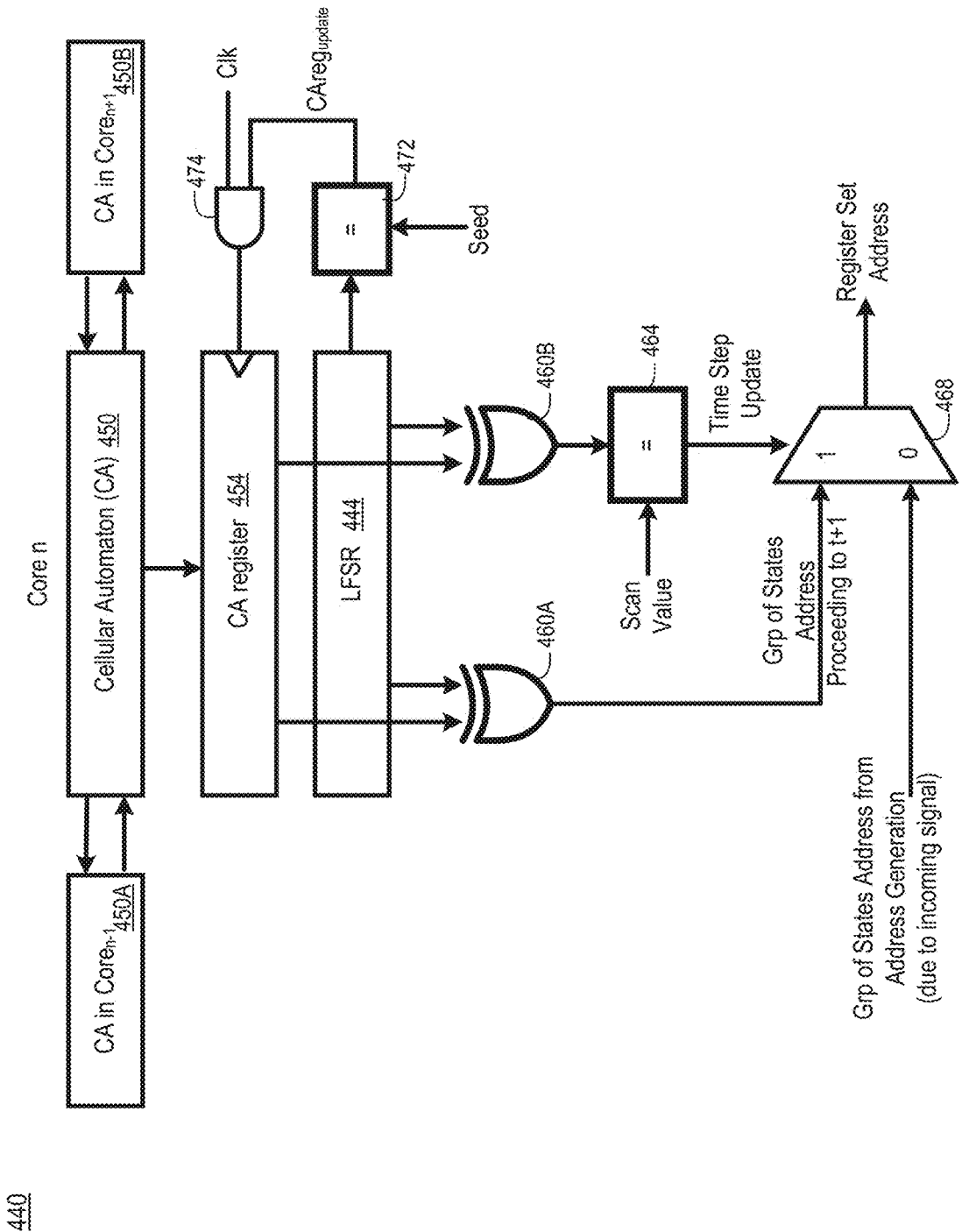
FIG. 4 is a block diagram of a time step controller, according to an embodiment of the present disclosure.

As discussed, when the time step update signal is activated, the time step-activated data path 160 may retrieve a group of states selected by the time step controller 140 (FIG. 4). If the membrane potential is greater than a signal threshold value 345, as determined by the comparator 344, then the time step-activated data path 160 may generate an outgoing data signal ("signal generation") and update various states of the selected group of states as a result. The outgoing data signal may include the identifier of the selected group of states and a memory address at which its weight is stored in the memory block 108.

Furthermore, responsive to the signal generation, the refractory period counter may be reset with the programmable maximum refractory period as discussed with reference to FIG. 3A. Additionally, responsive to the signal generation, the learning counter 322 may be reset to a programmable maximum counter value. This maximum counter value (for the learning counter) may be programmed as a parameter that drives how delays between learning operations for a group of states is to impact learning for that group of states. For example, the value of the learning counter 322 may be used in selecting a weight update value as discussed with reference to the learning operation of FIG. 6.

If, however, the membrane potential 314 of the selected group of states is less than or equal to the signal threshold value 345, then the membrane potential of the selected group of states is updated as follows. The multiplier 346 may multiply the membrane potential by a leak factor, which is less than one in a leak factor mode, to generate an updated membrane potential. (A leak factor refers to a value that may be used to modify the membrane potential by an incremental amount, as if by "leaking.") The updated membrane potential may then replace the membrane potential in the register set A 134. In a non-leak-factor mode, the lead factor may be one ("1"), and thus no additional update is made to the updated membrane potential.

As a further embodiment, the second comparator 354 may compare the input data value 330 of the selected group of states with a pseudo-randomly-generated input signal threshold. Responsive to the input data value 330 being greater than the pseudo-randomly-generated input signal threshold, the second adder 348 may add the input data value 330 to the first updated membrane potential before replacing the first membrane potential with the first updated membrane potential in the register set A 134.

As a still further embodiment, the third comparator 358 may compare the bias value 336 with a pseudo-randomly-generated bias signal threshold, which are both programmable values. A bias value 336 is a value used to revise (e.g., "bias") the leak factor in a certain way, and thus impact how the membrane potential 314 is modified. For example, responsive to the bias value being greater than the pseudo-randomly-generated input bias threshold, the second adder 348 may add the bias value to the first updated membrane potential before replacing the first membrane potential with the first updated membrane potential. In one embodiment, he bias value 336 may be fixed and the pseudo-randomly-generated bias signal threshold may be programmable to indicate how frequently the bias value 336 is to be added. In the case that both the second comparator 354 and the third comparator 358 signal are to add, respectively, the input data value 330 and the bias value 336, the third adder 360 may first add the input data value and the bias value together before their combination is added to the updated membrane potential. In one embodiment, any of the signal threshold value 345, the lead factor, the bias value 336, the input signal threshold, and/or the bias signal threshold may also be programmable parameters stored in the parameter memory 132.

FIG. 4 is a block diagram of a time step controller 440 such as the time step controller 140 of the computation block 106 of FIG. 1B. The time step controller 440, in one embodiment, may be designed to generate time step update signals pseudo-randomly, e.g., at pseudo-randomly-selected time and order of selection of a group of states. The selection of the group of states may thus be pseudo-randomly time-multiplexed. This randomization may help to reduce the chance of signal generation correlations between different groups of states across multiple computation blocks, which will be referred to here as "cores" as the time step controller 440 may be applicable to any group of interconnected processor cores. The randomization may be achieved by using programmable pseudo-random number generators.

More particularly, the time step controller 440 may include a linear feedback register (LFSR) 444, a cellular automaton (CA) 450 coupled between a CA 450A of a second core and a CA 450B of a third core, and a CA register coupled to the CA 450. The time step controller 440 may further include logic circuitry to complete the selection of a next group of states to select, and the timing of that selection. A cellular automaton (CA) in the present context is one of a multi-dimensional patchwork of pseudo-random number generators (cellular automata), where each CA is in a different state of a plurality of available states that depends, in part, on states of neighboring cellular automata according to a state update rule.

In one embodiment, the LFSR 444 pseudo-randomly generates a first value at a time step defined by a plurality of clock cycles. Because the LSFR 444 has a period set by a desired length of the time step in terms of clock cycles and goes over the pseudo-random patterns in a fixed order, the LSFR 444 may increase the correlation of signal generation across cores for the same group of states. Use of the CA 450 may ameliorate this correlation by being tightly integrated with the LSFR 444 and daisy-chained to CAs of other cores. This daisy-chain design may form long loops that can be routed across the cores such that each core has a different random value generated by its respective CA.

Accordingly, the CA 450 may pseudo-randomly generate a second value different than values generated by the second CA and the third CA and may do so at a time other than at a specific time step. The second value generated by the CA 450 may be captured at the beginning of a time step and stored in the CA register 454. An XOR gate 460 may then combine the first value with a state of the second value to determine an updated value that may dictate a group of states to be selected in a next time step.

As to the timing of the time step update, a second XOR gate 460B may also combine the first value with the second value, to generate the updated value. A comparator 464 may compare a sequencing portion of the updated value to a programmable scan value, and activate the time step update signal responsive to the sequencing portion matching the programmable scan value. In one embodiment, the time step update signal selects a group of states having an address provided by an address portion of the updated value, wherein the address corresponds to a location within the register set 133 for storing the group of states.

In one embodiment, the logic circuitry includes a second comparator 472 to compare the state of the first value (generated by the LFSR 444) to a seed value, and to generate a CA register update value when the two are equal. The seed value may be a pseudo-randomly-generated bit sequence, for example. This CA register update value may trigger a signal, through an AND gate 474 that combines the CA register update value with a clock, that in turn triggers the CA register 454 to accept an updated second value from the CA 450. This clock gating may ensure that the CA register 454 does not change its state until the LFSR 444 cycles through a plurality of pseudo-random sequence of states for a value stored in the CA register 454. In one embodiment, the core may implement "rule 30" for daisy-chaining capability, where the random bit of the CA 450 for time t+1 is given by:

$$CA[n](t+1)=CA[n-1](t)\oplus(CA[n](t)|CA[n+1](t)). \qquad \text{Equation (1)}$$

Figure 5:
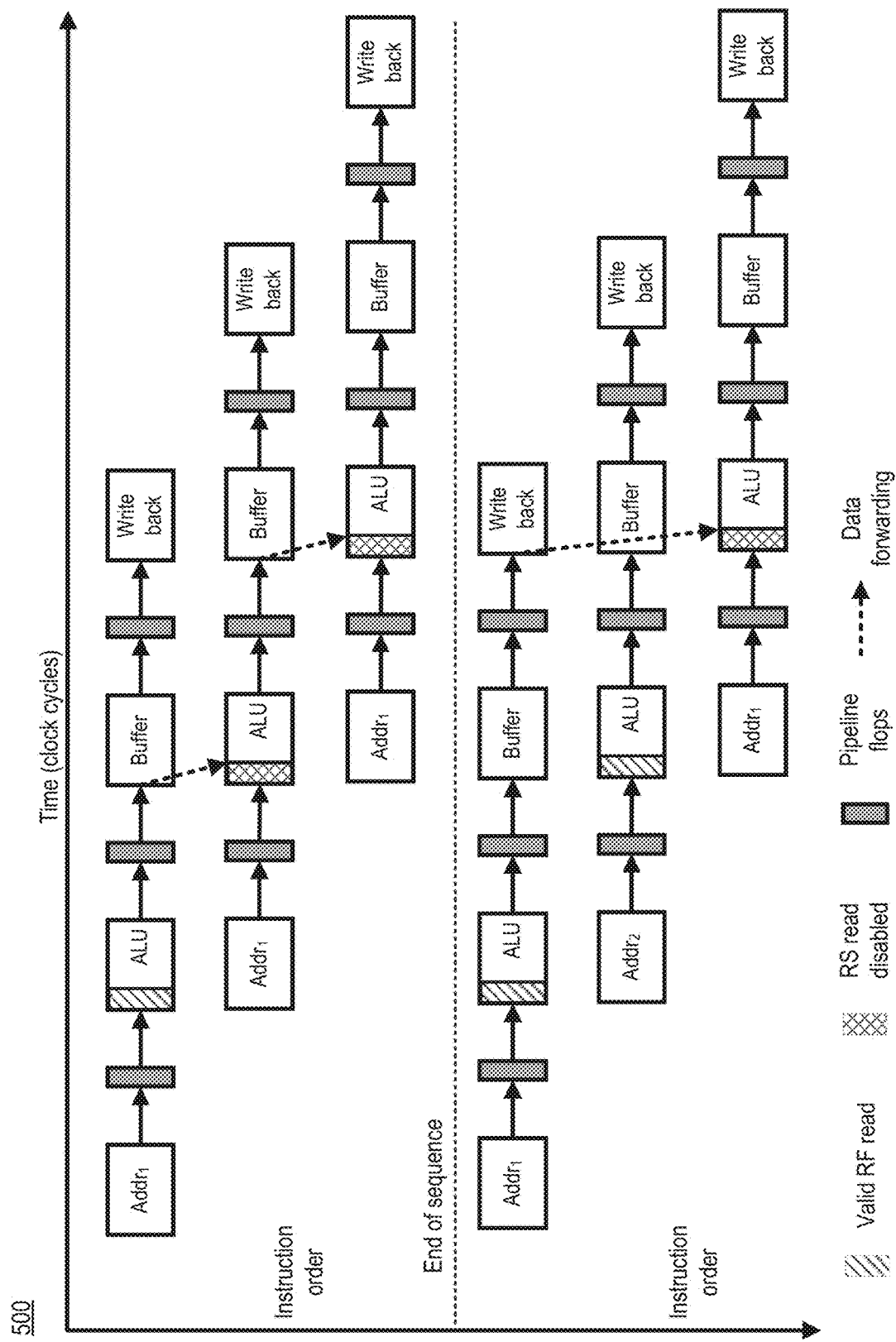
FIG. 5 is a flow diagram of a method of read-after-write (RAW) hazard mitigation control, according to an embodiment of the present disclosure.

FIG. 5 is a flow diagram of a method 500 of read-after-write (RΔW) hazard mitigation control, according to an embodiment of the present disclosure. The method 500 may be performed by a computation block such as the computation block 106 of FIGS. 1B and 3. In one embodiment, the computation block 106 is a core that supports multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The stochastic time step control for real-time signal integration may create potential read-after-write (RAW) hazards in a multithreaded pipeline of a the computation block 106, where consecutive signals may try to access the old states of the group of states instead of updated states still residing in the pipeline buffers. The proposed computation block 106 may incorporate hazard mitigation control for RAW hazards by implementing one or more data forwarding mechanisms. In FIG. 5, the top three rows illustrate data forwarding from a buffer stage, while the bottom three rows illustrate data forwarding from a write back stage.

In one embodiment, a RAW hazard is created when signals are consecutively generated in which the same address may try to access old states instead of the updated states still residing in the pipeline buffers. This is illustrated in the top three rows of FIG. 5 in which updated states from arithmetic logic unit (ALU) blocks in the signal-activated data path 120 and time step-activated data path 120 may be buffered before being written back into the register set 133. While the buffering occurs, register set (RF) reads corresponding to the state being processed are disabled until the RF write back occurs at the end of the last instruction that accesses the same address. Waiting to write back the updated state to the register set until after the RAW hazards are resolved minimizes power consumption that would normally be wasted on consecutive RF write activities. This way, consecutive spikes coming into the same neuron are converted to a single signal integration, thereby minimizing the number of register set accesses.

In another embodiment, a second RAW hazard is created when signals being processed are separated by two clock cycles. In this scenario, the data forwarding may occur between a first and a third cycle, for example, from a write back stage to an ALU block. Once again, register set reads of the state being processed are disabled until the RF write back occurs at the end of the last instruction that accesses the same address, with similar power savings as with the consecutive access scenario.

Figure 6:
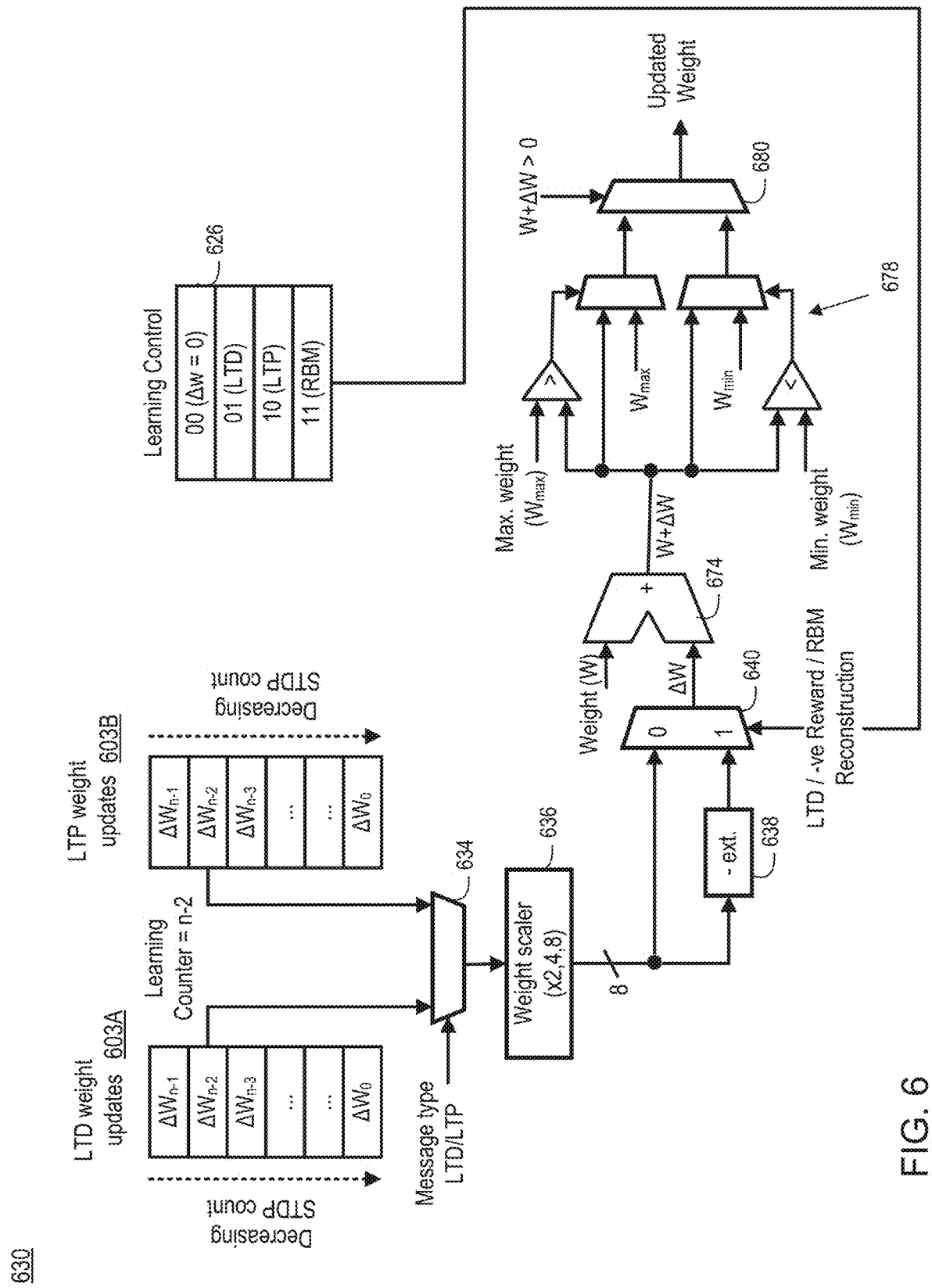
FIG. 6 is a block diagram of a learning unit of the computation block of FIGS. 1B and 3A, according to an embodiment of the present disclosure.

FIG. 6 is a block diagram of a learning unit 630 such as the learning unit 130 of the computation block 106 of FIGS. 1B and 3A, according to an embodiment of the present disclosure. In one embodiment, the learning unit 630 may include a first lookup table 603A containing LTD weight updates, a second lookup table 603B containing LTP weight updates 603B, a lookup table 626 (for the learning control state 326), a first multiplexer 634 to select between the two lookup tables 603A or 603B, a weight scaler 636, a sign extender 638, a second multiplexer 640, an adder 674, a weight bound checker 678, a third multiplexer 680. Upon receipt of an incoming data signal, the data signal includes a weight (W) (FIG. 1B). The learning unit 630 may perform the following operations to generate an updated weight (w) that may be sent to the memory block 108 to be stored in a location associated with a group of states identified in the incoming data signal.

In one embodiment, the learning counter 322 (stored in the register set A 134 as illustrated in FIG. 3A) may act as a pointer within the lookup tables 603A and 603B, in selecting a weight update value. The incoming data signal may indicate a message type, whether LTP or LTD and thus select, via the first multiplexer 634, from either the first lookup table 603A if the incoming message type is LTD or from the second lookup table 603B if the incoming message type if LTP. The weight scaler 636 may scale the weight update value (e.g., by 2, 4, 8 or another multiple) to obtain a larger weight update value for certain implementations. The sign extender 638 may then reverse a sign of the scaled weight update value, making the scaled weigh update value negative, to be provided as an option to decrement the incoming weight (W) in certain situations.

The learning unit 630 may then retrieve the learning control state 326 from the lookup table 626 (which may be stored in the register set A 134), for use in triggering the second multiplexer 640 to select from either the scaled weight update value or the signed-extended, or negative, scaled weight update value. For example, if the learning control state is "00," there is no learning and the incoming weight is passed to the output. If the learning control state is "01," the incoming data signal is LTD and the negative value (e.g., the sign extended, weight update value) is selected in order to decrement the incoming weight (W). If the learning control state 326 is "10," the incoming data signal is LTP and the non-sign-extended, weight update value is selected in order to increment the incoming weight (W).

In one embodiment, if the learning control state 326 is "11," the learning unit 630 may access modulatory bits received over the network that may correspond to an event-driven contrastive divergence (CD) phase in, for example, Restrictive Boltzmann Machines (RBM), inhibitory STDP, reward polarity, or some different ANN mapping. The event-driven CD is a special learning rule for spiking RBM, which is based on neural sampling that samples from a target Boltzmann distribution, and that uses potentiating and depressing symmetric STDP in two alternating phases. Accordingly, in one example, the "11" learning control state may cause selection of either the sign-extended or the non-sign-extended version of the weight update value depending on the phase of the event-drive CD learning algorithm, as dictated by the modulatory bits.

With further reference to FIG. 6, the adder 674 may then add the sign (or non-sign) extended version of the weigh update value ($\Delta W$) to the incoming weight (W) of the incoming data signal, to generate an updated weight value (W+$\Delta W$) for the group of states. The weight bound checker 678 may then check, using a maximum weight value ($W_{max}$) at an upper end and a minimum weight value ($W_{min}$) at a lower end, to ensure the updated weight value does not exceed these bounds. The third multiplexer 680 may then pass the positive or negative weight depending on the sign of the updated weight value. The resultant updated weight (w) may then be transmitted to the router 110 to be sent to the memory block 108 for storage as previously discussed.

In one embodiment, a programmable weight update curve may be stored in parameter memory 132. The learning unit 130 may parse the weight update curve to generate an LTP portion and an LTP portion of the weight update curve, to be saved to the parameter memory. The learning unit 630 may program the weight update curve by controlling the ratio of LTD versus LTP learning through amplitude and/or duration manipulation of the weight update curve. The learning unit 130 may further generate selectable weight update values (stored in the update tables 603A and 603B) based on the LTP portion and the LTP portions of the weight update curve, respectively.

As illustrated, the learning unit 630 is tightly integrated with the computation block to support various types of STDP learning such as symmetric, asymmetric, reward-modulation, inhibitory STDP, and the like. Symmetric SDTP may include the pre-before-post signal intervals and post-before-pre signal intervals that induce similar weight updates. Asymmetric SDTP may include a pre-before-post signal generation interval that has an opposite effect on synaptic weights when compared to post-before-pre signal generation interval. In contrast, typical pre-before-post signal generation induces LTP, which corresponds to weight increase, and post-before-pre signal generation induces LTD, which corresponds to a decrement in weight value. Reward-modulation STDP often involves a reward value that modulates the underlying STDP rule. For example, the reward signals could match the target signal generation rate of an output neuron during a training phase. Whenever the computation block corresponding to the desired output generates an outgoing signal for a certain group of states, the fan-in weights are potentiated. Similarly, a negative reward could depress the weights associated with other output groups of states when they generate an outgoing data signal. Inhibitory STDP may be a symmetric, non-monotonic learning rule for learning inhibitory connections in an excitatory-inhibitory (E-I) spiking neural network. Inhibitory neurons help to achieve a balance in network equilibrium in E-I networks.

FIG. 7A is a block diagram illustrating a micro-architecture for a processor 700 to perform operations of the computation block 106 of FIGS. 1B and 3. Specifically, processor 700 depicts an in-order architecture core and a register renaming logic, out-of-order issue/execution logic to be included in a processor according to at least one embodiment of the disclosure. The embodiments of the computation block 106 of FIGS. 1B and 3 can be implemented by the processor 700.

Processor 700 includes a front end unit 730 coupled to an execution engine unit 750, and both are coupled to a memory unit 770. The processor 700 may include a reduced instruction set computing (RISC) core, a complex instruction set computing (CISC) core, a very long instruction word (VLIW) core, or a hybrid or alternative core type. As yet another option, processor 700 may include a special-purpose core, such as, for example, a network or communication core, compression engine, graphics core, or the like. In one embodiment, processor 700 may be a multi-core processor or may be part of a multi-processor system.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 740 may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations (RS), central instruction window, etc. The scheduler unit(s) 756 is coupled to the physical register set(s) unit(s) 758. Each of the physical register set(s) units 758 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 758 is overlapped by the retirement unit 754 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register set(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 756, physical register set(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which may include a data prefetcher 780, a data TLB unit 772, a data cache unit (DCU) 774, and a level 2 (L2) cache unit 776, to name a few examples. In some embodiments DCU 774 is also known as a first level data cache (L1 cache). The DCU 774 may handle multiple outstanding cache misses and continue to service incoming stores and loads. It also supports maintaining cache coherency. The data TLB unit 772 is a cache used to improve virtual address translation speed by mapping virtual and physical address spaces. In one exemplary embodiment, the memory access units 764 may include a load unit, a store address unit, and a store data unit, each of which is coupled to the data TLB unit 772 in the memory unit 770. The L2 cache unit 776 may be coupled to one or more other levels of cache and eventually to a main memory.

In one embodiment, the data prefetcher 780 speculatively loads/prefetches data to the DCU 774 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 700 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor. Note that instruction cache unit 734, data cache unit 774, and L2 cache unit 776 would not generally implement the process described in this disclosure, as generally these cache units use on-die memory that does not exhibit page-locality behavior.

FIG. 7B is a block diagram illustrating an in-order pipeline and a register renaming stage, out-of-order issue/execution pipeline implemented by processor 700 of FIG. 7A according to some embodiments of the disclosure. The solid lined boxes in FIG. 7B illustrate an in-order pipeline, while the dashed lined boxes illustrates a register renaming, out-of-order issue/execution pipeline. In FIG. 7B, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724. In some embodiments, the ordering of stages 702-724 may be different than illustrated and are not limited to the specific ordering shown in FIG. 7B.

Figure 8:
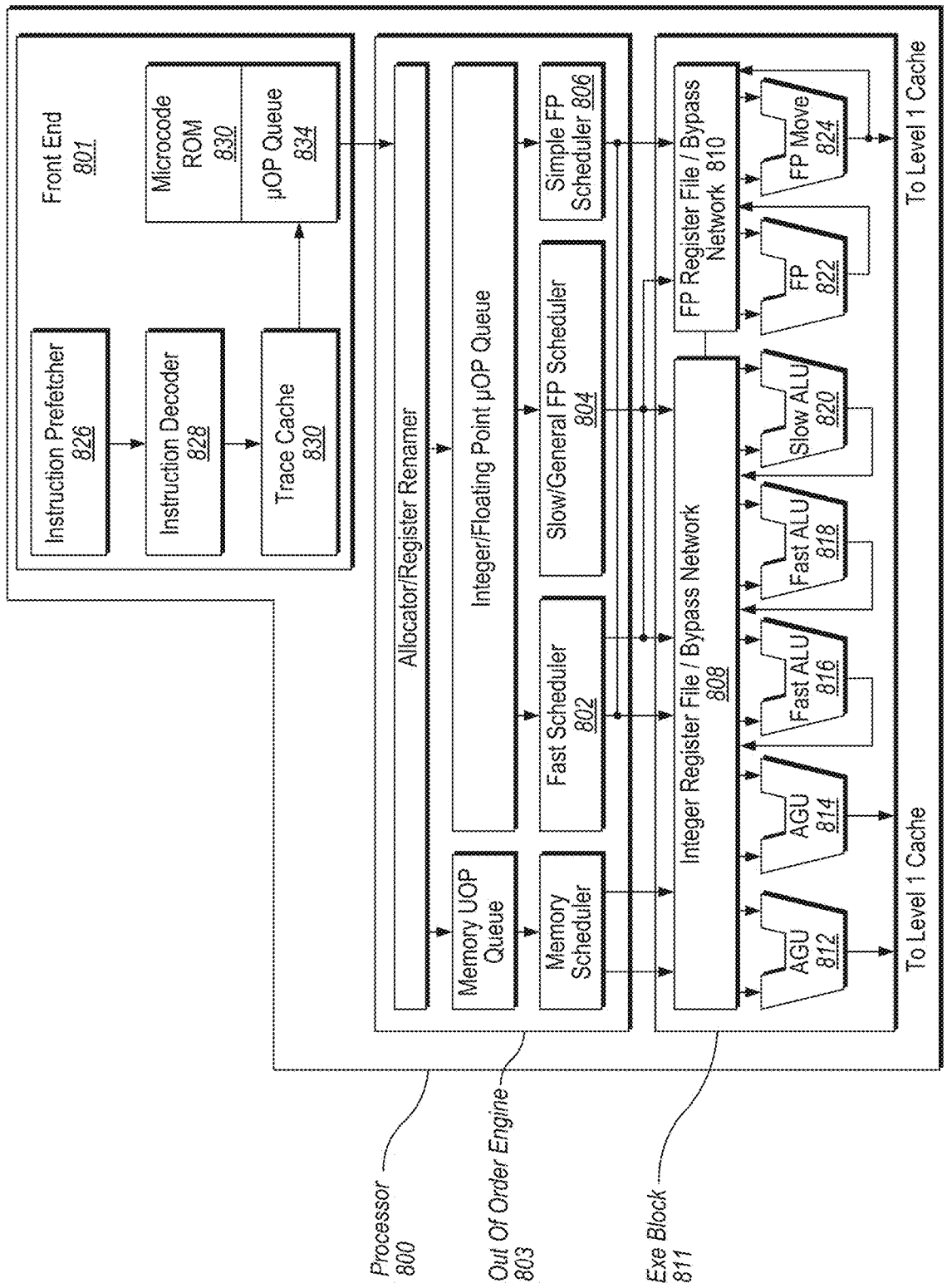
FIG. 8 illustrates a block diagram of the micro-architecture for a processor that includes logic circuits to perform at least some operations of the computation block of FIGS. 1B and 3.

FIG. 8 illustrates a block diagram of the micro-architecture for a processor 800 that includes logic circuits that may be used to perform operations of the computation block 106 of FIGS. 1B and 3, according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 801 is the part of the processor 800 that fetches instructions to be executed and prepares them to be used later in the processor pipeline. The embodiments of the page additions and content copying can be implemented in processor 800.

The front end 801 may include several units. In one embodiment, the instruction prefetcher 816 fetches instructions from memory and feeds them to an instruction decoder 818 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 830 takes decoded uops and assembles them into program ordered sequences or traces in the uop queue 834 for execution. When the trace cache 830 encounters a complex instruction, microcode ROM (or RAM) 832 provides the uops needed to complete the operation.

Some instructions are converted into a single micro-op, whereas others need several micro-ops to complete the full operation. In one embodiment, if more than four micro-ops are needed to complete an instruction, the decoder 818 accesses the microcode ROM 832 to do the instruction. For one embodiment, an instruction can be decoded into a small number of micro ops for processing at the instruction decoder 818. In another embodiment, an instruction can be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one embodiment from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one embodiment can schedule on each half of the main clock cycle while the other schedulers can only schedule once per main processor clock cycle. The schedulers arbitrate for the dispatch ports to schedule uops for execution.

Register sets 808, 810, sit between the schedulers 802, 804, 806, and the execution units 812, 814, 816, 818, 820, 822, 824 in the execution block 811. There is a separate register set 808, 810, for integer and floating point operations, respectively. Each register set 808, 810, of one embodiment also includes a bypass network that can bypass or forward just completed results that have not yet been written into the register set to new dependent uops. The integer register set 808 and the floating point register set 810 are also capable of communicating data with the other. For one embodiment, the integer register set 808 is split into two separate register sets, one register set for the low order 32 bits of data and a second register set for the high order 32 bits of data. The floating point register set 810 of one embodiment has 128 bit wide entries because floating point instructions typically have operands from 64 to 128 bits in width.

The execution block 811 contains the execution units 812, 814, 816, 818, 820, 822, 824, where the instructions are actually executed. This section includes the register sets 808, 810, that store the integer and floating point data operand values that the micro-instructions need to execute. The processor 800 of one embodiment is comprised of a number of execution units: address generation unit (AGU) 812, AGU 814, fast ALU 816, fast ALU 818, slow ALU 810, floating point ALU 812, floating point move unit 814. For one embodiment, the floating point execution blocks 812, 814, execute floating point, MMX, SIMD, and SSE, or other operations. The floating point ALU 812 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 816, 818. The fast ALUs 816, 818, of one embodiment can execute fast operations with an effective latency of half a clock cycle. For one embodiment, most complex integer operations go to the slow ALU 820 as the slow ALU 820 includes integer execution hardware for long latency type of operations, such as a multiplier, shifts, flag logic, and branch processing. Memory load/store operations are executed by the AGUs 822, 824. For one embodiment, the integer ALUs 816, 818, 820, are described in the context of performing integer operations on 64 bit data operands. In alternative embodiments, the ALUs 816, 818, 820, can be implemented to support a variety of data bits including 16, 32, 128, 256, etc. Similarly, the floating point units 822, 824, can be implemented to support a range of operands having bits of various widths. For one embodiment, the floating point units 822, 824, can operate on 128 bits wide packed data operands in conjunction with SIMD and multimedia instructions.

In one embodiment, the uops schedulers 802, 804, 806, dispatch dependent operations before the parent load has finished executing. As uops are speculatively scheduled and executed in processor 800, the processor 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register set of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register set or different register sets. Furthermore, in one embodiment, floating point and integer data may be stored in different registers or the same registers.

Figure 9:
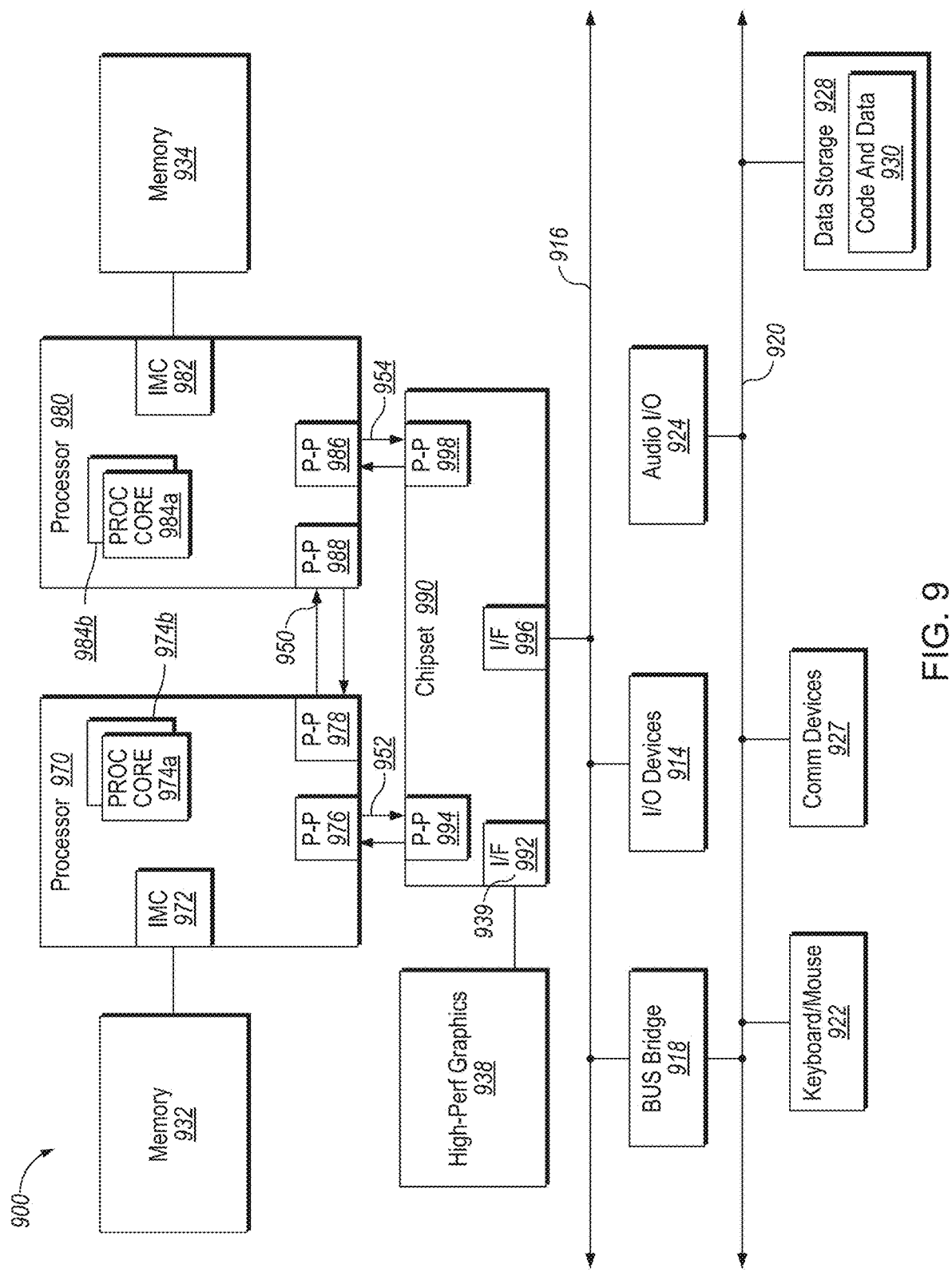
FIG. 9 is a block diagram of a computer system according to one implementation.

Embodiments may be implemented in many different system types. Referring now to FIG. 9, shown is a block diagram of a multiprocessor system 900 in accordance with an implementation. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be multicore processors, including first and second processor cores (i.e., processor cores 974a and 974b and processor cores 984a and 984b), although potentially many more cores may be present in the processors.

While shown with two processors 970, 980, it is to be understood that the scope of the present disclosure is not so limited. In other implementations, one or more additional processors may be present in a given processor.

Processors 970 and 980 are shown including integrated memory controller units 972 and 982, respectively. Processor 970 also includes as part of its bus controller units point-to-point (P-P) interfaces 976 and 988; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode. Page locality may also be created in the shared cache across one or more cache controllers when allocating entries to the shared cache.

Chipset 990 may be coupled to a first bus 916 via an interface 996. In one embodiment, first bus 916 may be a Peripheral Component Interconnect (PCI) bus, or a bus such as a PCI Express bus or interconnect bus, although the scope of the present disclosure is not so limited.

Figure 10:
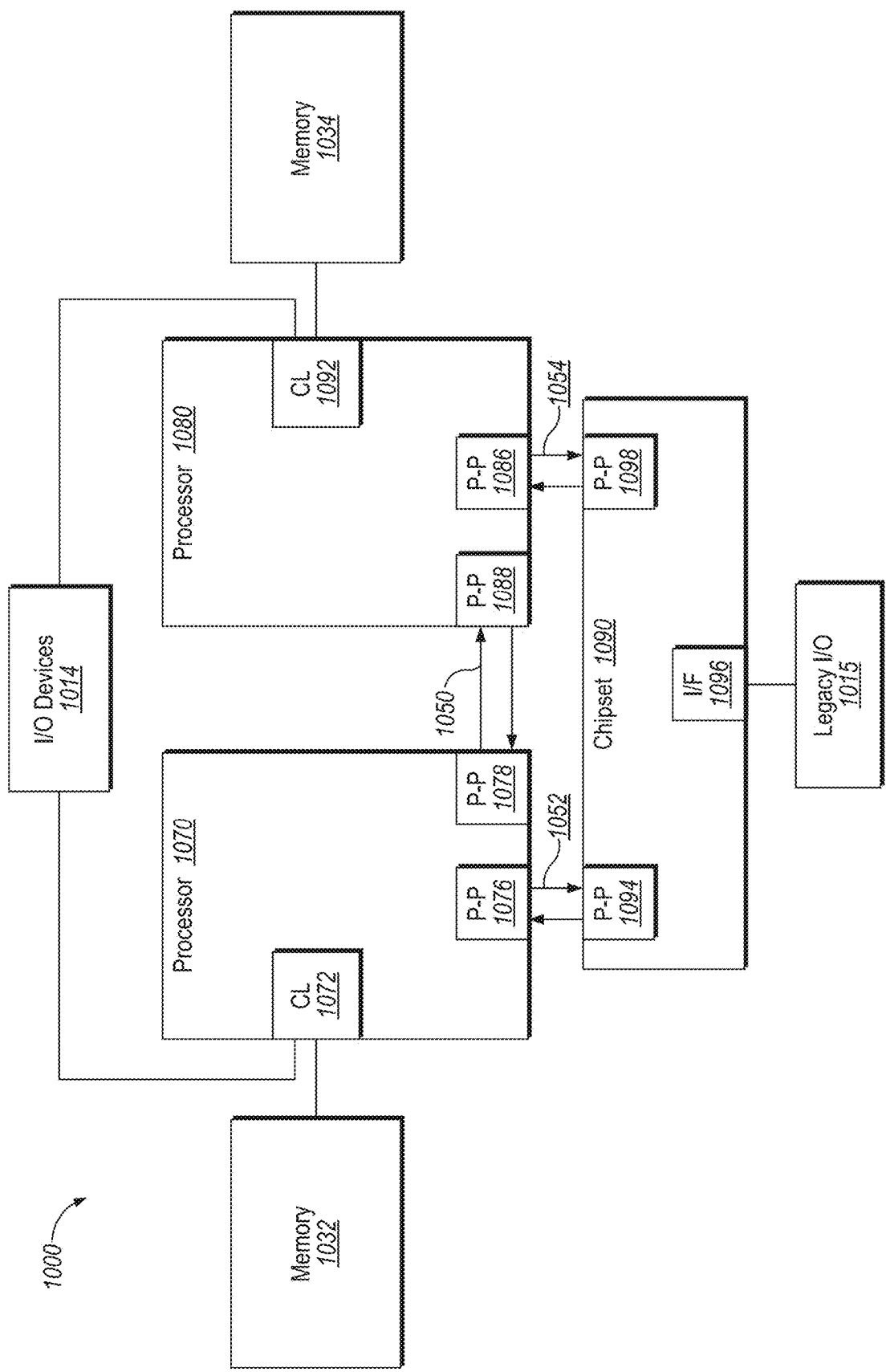
FIG. 10 is a block diagram of a computer system according to another implementation.

Referring now to FIG. 10, shown is a block diagram of a third system 1000 in accordance with an embodiment of the present disclosure. Like elements in FIGS. 9 and 10 bear like reference numerals, and certain aspects of FIG. 10 have been omitted from FIG. 9 in order to avoid obscuring other aspects of FIG. 10.

FIG. 10 illustrates that the processors 1070, 1080 may include integrated memory and I/O control logic ("CL") 1072 and 1092, respectively. For at least one embodiment, the CL 1072, 1082 may include integrated memory controller units such as described herein. In addition. CL 1072, 1092 may also include I/O control logic. FIG. 10 illustrates that the memories 1032, 1034 are coupled to the CL 1072, 1092, and that I/O devices 1014 are also coupled to the control logic 1072, 1092. Legacy I/O devices 1015 are coupled to the chipset 1090.

Figure 11:
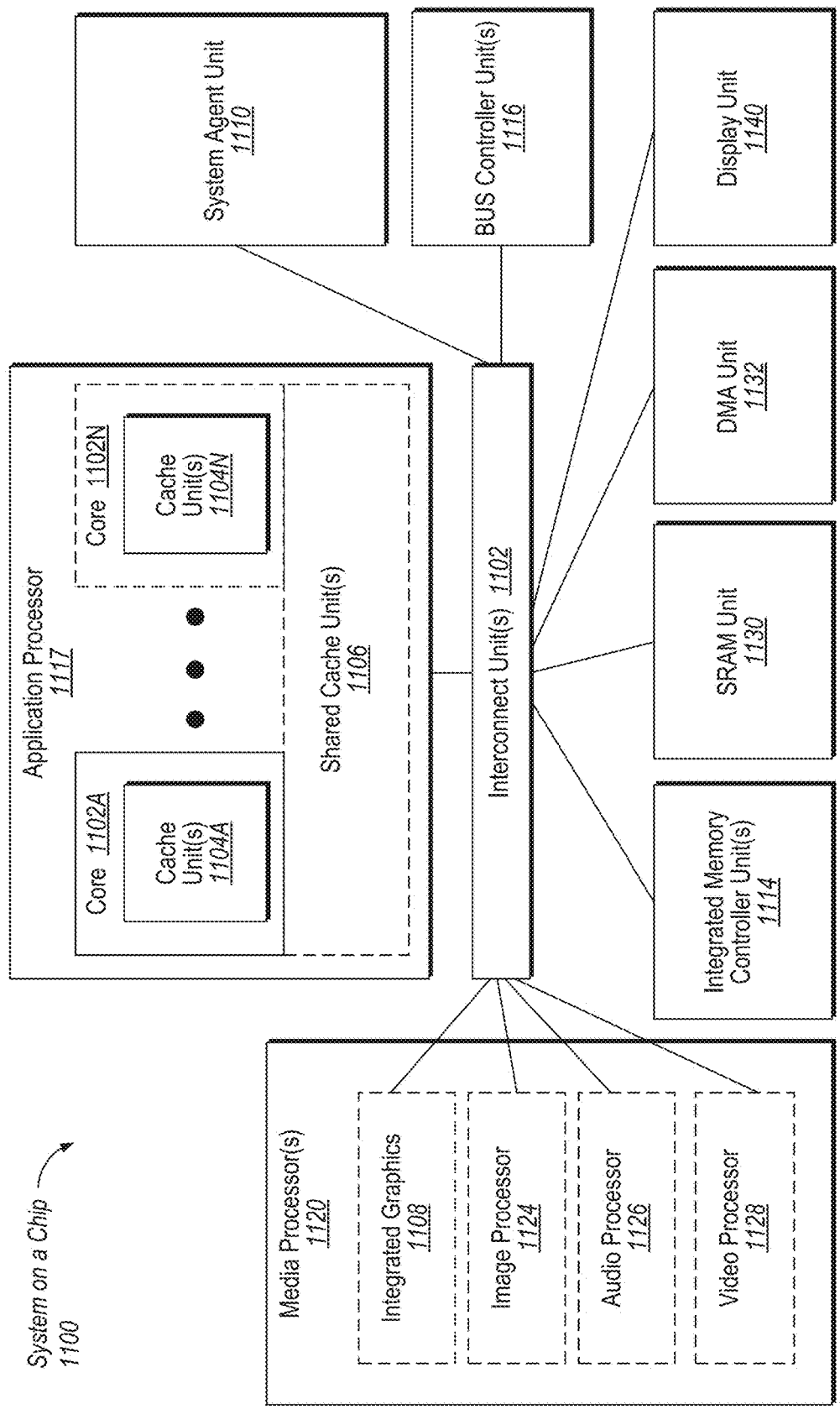
FIG. 11 is a block diagram of a system-on-a-chip according to one implementation.

FIG. 11 is an exemplary system on a chip (SoC) 1100 that may include one or more of the cores 1102. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1100 of FIG. 11, dashed lined boxes are features on more advanced SoCs. An interconnect unit(s) 1102 may be coupled to: an application processor 1117 which includes a set of one or more cores 1102A-N and shared cache unit(s) 1106; a system agent unit 1110; a bus controller unit(s) 1116; an integrated memory controller unit(s) 1114; a set or one or more media processors 1120 which may include integrated graphics logic 1108, an image processor 1124 for providing still and/or video camera functionality, an audio processor 1126 for providing hardware audio acceleration, and a video processor 1128 for providing video encode/decode acceleration; a static random access memory (SRAM) unit 1130; a direct memory access (DMA) unit 1132; and a display unit 1140 for coupling to one or more external displays.

Figure 12:
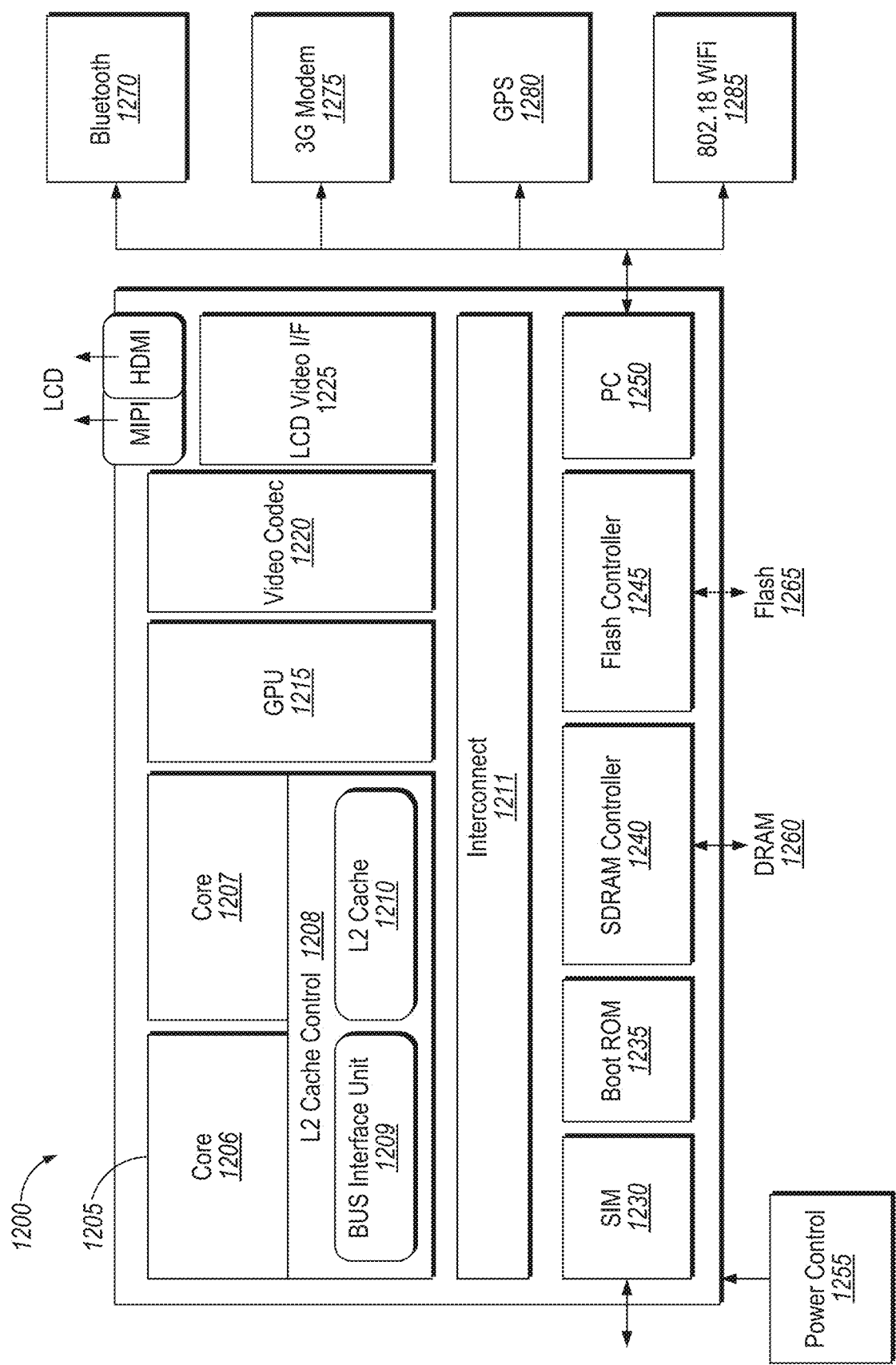
FIG. 12 illustrates another implementation of a block diagram for a computing system.

Turning next to FIG. 12, an embodiment of a system on-chip (SoC) design in accordance with embodiments of the disclosure is depicted. As an illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1200.

Here, SoC 1200 includes 2 cores—1206 and 1207. Similar to the discussion above, cores 1206 and 1207 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which can implement one or more aspects of the described disclosure.

In one embodiment, SDRAM controller 1240 may connect to interconnect 1211 via cache 125. Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the embodiments described herein.

In addition, the system illustrates peripherals for communication, such as a Bluetooth® module 1270, 3G modem 1275, GPS 1280, and Wi-Fi® 1285. Note as stated above, a UE includes a radio for communication. As a result, these peripheral communication modules may not all be included. However, in a UE some form of a radio for external communication should be included.

Figure 13:
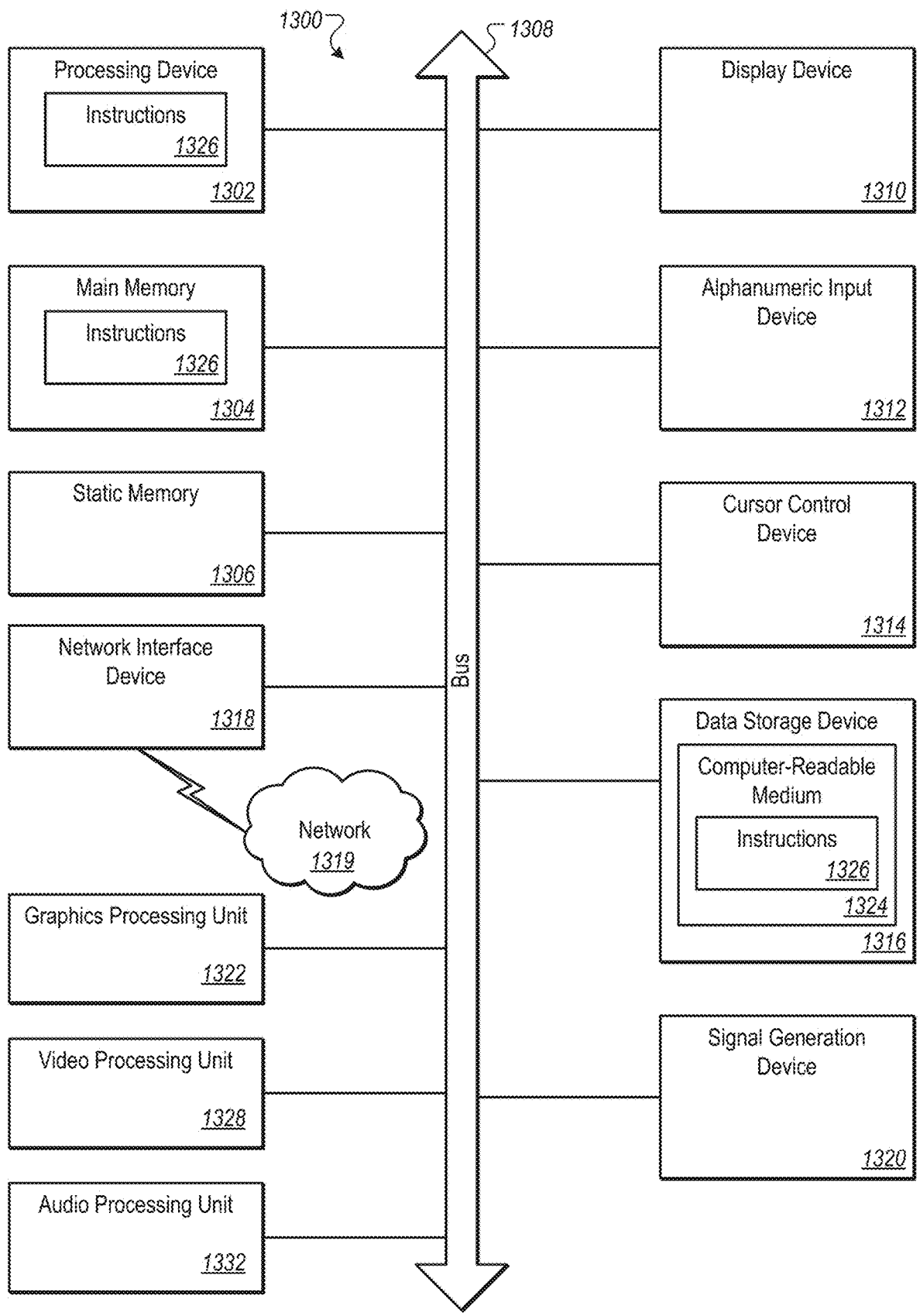
FIG. 13 illustrates another implementation of a block diagram for a computing system.

FIG. 13 illustrates a diagrammatic representation of a machine in the example form of a computing system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1300.

The computing system 1300 includes a processing device 1302, main memory 1304 (e.g., flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1308. In one embodiment, the bus 1308 may be made up of the system bus 170-1 and/or the memory bus 170-2 of FIG. 1, and the memory and peripheral devices sharing the bus 1308 may be or work through the system agent 114 similar to as discussed with reference to FIG. 1.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processor cores. The processing device 1302 is configured to execute the processing logic 1326 for performing the operations discussed herein.

In one embodiment, processing device 1302 can be part of the computing system 100 of FIG. 1. Alternatively, the computing system 1300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1318 communicably coupled to a network 1319. The computing system 1300 also may include a video display device 1310 (e.g., a liquid crystal display (LCD) or a cathode ray tube (CRT)), an alphanumeric input device 1310 (e.g., a keyboard), a cursor control device 1314 (e.g., a mouse), a signal generation device 1320 (e.g., a speaker), or other peripheral devices. Furthermore, computing system 1300 may include a graphics processing unit 1322, a video processing unit 1328 and an audio processing unit 1332. In another embodiment, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic during execution thereof by the computing system 1300; the main memory 1304 and the processing device 1302 also constituting computer-readable storage media.

The computer-readable storage medium 1324 may also be used to store instructions 1326 utilizing the processing device 1302, such as described with respect to FIGS. 1 and 2, and/or a software library containing methods that call the above applications. While the computer-readable storage medium 1324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an integrated circuit comprising: 1) a time step controller to activate a time step update signal for performing a time-multiplexed selection of a group of neuromorphic states to update; and 2) a first circuitry to, responsive to detecting the time step update signal for a selected group of neuromorphic states: a) generate an outgoing data signal in response to determining that a first membrane potential of the selected group of neuromorphic states exceeds a threshold value, wherein the outgoing data signal includes an identifier that identifies the selected group of neuromorphic states and a memory address, wherein the memory address corresponds to a location in a memory block associated with the integrated circuit; and b) update a state of the selected group of neuromorphic states in response to generation of the outgoing data signal.

In Example 2, the integrated circuit of Example 1, wherein the time step controller is to randomly activate the time step update signal, the integrated circuit further comprising a second circuitry to, responsive to receipt of an incoming data signal corresponding to a second group of neuromorphic states: a) add a weight value of the incoming data signal to a second membrane potential of the second group of neuromorphic states, to generate an updated second membrane potential; and b) store the updated second membrane potential back to the register set.

In Example 3, the integrated circuit of Example 2, further comprising 1) a register set to store the selected group of neuromorphic states and the second group of neuromorphic states, wherein the second circuitry is further to: a) identify, within the register set, a register storing the second group of neuromorphic states corresponding to a second identifier retrieved from the incoming data signal; and b) retrieve the second membrane potential from the register set, wherein the register set comprises a first register set to store a subset of the group of second neuromorphic states accessed by the second circuitry, and a second register set to store a second subset of the group of second neuromorphic states that are also accessed by the first circuitry.

In Example 4, the integrated circuit of Example 2, wherein the second circuitry further comprises a learning unit to perform a learning operation by updating the weight value for the second group of neuromorphic states, to generate an updated weight value, and wherein the second circuitry is further to transmit the updated weight value through a router, the updated weight value to be stored in the memory block.

In Example 5, the integrated circuit of Example 4, wherein a state of the group of second neuromorphic states is reflected by a learning counter, and the first circuitry is further to: a) set the learning counter to a maximum counter value upon generation of an outgoing data signal for the second group of neuromorphic states; b) decrement the learning counter responsive to each time step update signal; and c) wherein the learning counter is further to trigger selection of a weight update value that is added to or subtracted from the weight value, to generate the updated weight value.

In Example 6, the integrated circuit of Example 2, wherein a state of the group of second neuromorphic states is reflected by a refractory period counter, and the first circuitry is further to: a) set the refractory period counter to a maximum counter value upon generation of an outgoing data signal for the second group of neuromorphic states; and b) decrement the refractory period counter responsive to each time step update signal, wherein the first circuitry is to block generation of a subsequent outgoing data signal and the second circuitry is to block adding a weight value of a subsequent incoming data signal until the refractory period counter reaches zero.

In Example 7, the integrated circuit of Example 1, wherein the first circuitry is further to: a) multiply the first membrane potential of the selected group of neuromorphic states with a leak factor to generate a first updated membrane potential; and b) responsive to the first membrane potential being less than the threshold value, replace the first membrane potential with the first updated membrane potential.

In Example 8, the integrated circuit of Example 7, wherein the first circuitry is further to: a) compare an input data value of the selected group of neuromorphic states with a pseudo-randomly-generated input signal threshold; and b) responsive to the input data value being greater than the pseudo-randomly-generated input signal threshold, add the input data value to the first updated membrane potential before replacing the first membrane potential with the first updated membrane potential.

In Example 9, the integrated circuit of Example 7, wherein the first circuitry is further to: a) compare a bias value for the selected group of neuromorphic states with a pseudo-randomly-generated input bias threshold; and b) responsive to the bias value being greater than the pseudo-randomly-generated input bias threshold, add the bias value to the first updated membrane potential before replacing the first membrane potential with the first updated membrane potential.

Various embodiments may have different combinations of the structural features described above. For instance, all optional features of the computing system described above may also be implemented with respect to the method or process described herein and specifics in the examples may be used anywhere in one or more embodiments.

Example 10 is a system comprising: 1) a memory block; 2) a computation block; and 3) a router coupled to the memory block and to the computation block; wherein the computation block comprises: 3) a time step controller to activate a time step update signal for performing a time-multiplexed selection of a group of neuromorphic states to update; 4) a first circuitry to, responsive to detecting the time step update signal for a selected group of neuromorphic states: a) generate an outgoing data signal in response to determining that a first membrane potential of the selected group of neuromorphic states exceeds a threshold value, wherein the outgoing data signal includes an identifier that identifies the selected group of neuromorphic states and a memory address, wherein the memory address corresponds to a location in the memory block; and b) update a state of the selected group of neuromorphic states in response to generation of the outgoing data signal; and 5) a learning unit to, responsive to detecting no time step update signal and to receipt of an incoming data signal, perform a learning operation by: a) identifying a second group of neuromorphic states corresponding to an identifier retrieved from the incoming data signal; and b) updating a weight value of the incoming data signal, to generate an updated weight value to be provided to the router, for storage at a second memory address of the memory block.

In Example 11, the system of Example 10, further comprising 1) a register set to store the selected group of neuromorphic states and the second group of neuromorphic states, wherein the computation block further comprises 2) a second circuitry to, responsive to receipt of the incoming data signal: a) identify a register, within the register set, for the second group of neuromorphic states; b) retrieve, from the register, a second membrane potential for the second group of neuromorphic states; c) add the weight value of the incoming data signal to the second membrane potential of the second group of neuromorphic states, to generate an updated second membrane potential; and d) store the updated second membrane potential back to the register set.

In Example 12, the system of Example 11, wherein the register set comprises a first register set to store a subset of the group of second neuromorphic states accessed by the second circuitry, and a second register set to store a second subset of the group of second neuromorphic states that are also accessed by the first circuitry.

In Example 13, the system of Example 11, wherein a state of the group of second neuromorphic states is reflected by 1) a learning counter, and the first circuitry is further to: a) set the learning counter to a maximum counter value upon generation of an outgoing data signal for the second group of neuromorphic states; b) decrement the learning counter responsive to each time step update signal; and c) wherein the learning counter is further to trigger selection of a weight update value to one of add to or subtract from the weight value, to generate the updated weight value.

In Example 14, the system of Example 10, wherein the first circuitry is further to: a) multiply the first membrane potential of the selected group of neuromorphic states with a leak factor to generate an updated first membrane potential; and b) responsive to the membrane potential being less than the threshold value, replace the first membrane potential with the updated first membrane potential.

Various embodiments may have different combinations of the structural features described above. For instance, all optional features of the processors and methods described above may also be implemented with respect to a system described herein and specifics in the examples may be used anywhere in one or more embodiments.

Example 15 is a system comprising 1) a plurality of cores, wherein 2) a first core of the plurality of cores comprises: 30 a register set to store multiple groups of neuromorphic states; and 3) a time step controller comprising: 40 a linear-feedback shift register (LFSR) to pseudo-randomly generate a first value at a time step defined by a plurality of clock cycles; and 5) a cellular automaton (CA) coupled to a second CA of a second core and to a third CA of a third core of the plurality of cores, wherein the CA is to: a) pseudo-randomly generate a second value different than values generated by the second CA and the third CA; and b) store the second value into a CA register coupled to the CA; and 6) a logic circuitry to combine the first value with the second value to generate an updated value, and to use the updated value to determine at what time step, and for which group of neuromorphic states of the multiple groups of neuromorphic states, to activate a time step update signal.

In Example 16, the system of Example 15, wherein the logic circuitry includes an XOR gate to combine the first value with the second value.

In Example 17, the system of Example 15, wherein the logic circuitry is further to: a) compare a sequencing portion of the updated value with a programmable scan value; and b) activate the time step update signal responsive to the sequencing portion matching the programmable scan value, the time step update signal to select a group of neuromorphic states having an address provided by an address portion of the updated value, wherein the address corresponds to a location within a register set for storing the group of neuromorphic states.

In Example 18, the system of Example 17, wherein the logic circuitry includes clock gating of the CA register controlled by a pseudo-random bit, to ensure the LFSR proceeds through a plurality of available pseudo-random states for the second value stored in CA register.

Various embodiments may have different combinations of the structural features described above. For instance, all optional features of the processors and methods described above may also be implemented with respect to a system described herein and specifics in the examples may be used anywhere in one or more embodiments.

Example 19 is an integrated circuit comprising 1) a core for updating multiple groups of neuromorphic states, the core comprising: 2) a register set to store the multiple groups of neuromorphic states; and 3) a learning unit coupled to the register set and to, responsive to receipt of an incoming data signal, perform a learning operation comprising to: a) identify a group of neuromorphic states, of the multiple groups of neuromorphic states, corresponding to an identifier retrieved from incoming data signal; b) retrieve a weight update value corresponding to a learning counter value stored in the register set for the group of neuromorphic states, wherein the weight update value is also based on an incoming learning message type; c) selectively perform a sign extension to the weight update value depending on a state of a set of learning control bits, to generate a sign-extended weight update value; and d) add the sign-extended weight update value to a weight value of the incoming data signal, to generate an updated weight value for the group of neuromorphic states.

In Example 20, the integrated circuit of Example 19, wherein the incoming learning message type comprises one of long-term depression (LTD) or long-term potentiation (LTP), and wherein the state of the set of learning control bits comprises one of: a) elimination of the sign-extended update weight value; b) retaining the weight update value as a positive value in response to an LTP incoming learning message; c) making the weight update value a negative value in response to an LTD incoming learning message; or d) selecting one of the positive value or the negative value of the weight update value according to a plurality of modulatory bits received over a network to which the core is communicatively coupled via a router.

In Example 21, the integrated circuit of Example 20, further comprising 1) a programmable parameter memory in which is stored a weight update curve comprising an LTD portion and an LTP portion of the weight update curve, and the learning unit is further to: a) manipulate the weight update curve to control a ratio of LTD versus LTP learning; and b) generate selectable weight update values based on the LTD portion and the LTP portion of the weight update curve.

In Example 22, the integrated circuit of the Example 19, wherein the learning unit is further to perform a set of maximum and minimum boundary checks on the sign-extended weight update value according to a programmable maximum weight and a programmable minimum weight.

In Example 23, the integrated circuit of Example 19, wherein the learning unit is further to apply a weight scale to the weight update value before selectively performing the sign extension, to generate a larger weight update value.

In Example 24, the integrated circuit of Example 19, wherein the core further comprises a time step controller to activate a time step update signal that performs a time-multiplexed selection of the group of neuromorphic states of the multiple groups of neuromorphic states, and the learning unit is to perform the learning operation when the time step update signal is not detected.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An integrated circuit comprising:
   a time step controller to randomly activate a time step update signal for performing a randomly time-multiplexed selection of a group of neuromorphic states to update;
   a time-step-activated circuitry coupled to the time step controller and to, responsive to detecting the time step update signal for a selected group of neuromorphic states:
      generate an outgoing data signal in response to determining that a first membrane potential of the selected group of neuromorphic states exceeds a threshold value, wherein the outgoing data signal includes an identifier that identifies the selected group of neuromorphic states and a memory address that identifies a location in a memory block associated with the integrated circuit, and
      update a state of the selected group of neuromorphic states in response to generation of the outgoing data signal; and
   a signal-activated circuitry coupled to the time step controller and to, responsive to the time step update signal not being activated and to receipt of an incoming data signal corresponding to a second group of neuromorphic states:
      add a weight value of the incoming data signal to a second membrane potential of the second group of neuromorphic states, to generate an updated second membrane potential, and
      store the updated second membrane potential to a register set, wherein the signal-activated circuitry is separate from the time-step-activated circuitry.

2. The integrated circuit of claim 1, further comprising the register set to store the selected group of neuromorphic states and the second group of neuromorphic states, wherein the signal-activated circuitry is further to:
   identify, within the register set, a register storing the second group of neuromorphic states corresponding to a second identifier retrieved from the incoming data signal; and
   retrieve the second membrane potential from the register set, wherein the register set comprises a first register set to store a first subset of the group of second neuromorphic states accessed by the signal-activated circuitry, and a second register set to store a second subset of the group of second neuromorphic states that are also accessed by the time-step-activated circuitry.

3. The integrated circuit of claim 1, wherein the signal-activated circuitry further comprises a learning unit to perform a learning operation by updating the weight value for the second group of neuromorphic states, to generate an updated weight value, and wherein the signal-activated circuitry is further to transmit the updated weight value through a router, the updated weight value to be stored in the memory block.

4. The integrated circuit of claim 3, wherein a state of the group of second neuromorphic states is reflected by a learning counter, and the time-step-activated circuitry is further to:
set the learning counter to a maximum counter value upon generation of an outgoing data signal for the second group of neuromorphic states:
decrement the learning counter responsive to each time step update signal; and
wherein the learning counter is further to trigger selection of a weight update value that is added to or subtracted from the weight value, to generate the updated weight value.

5. The integrated circuit of claim 1, wherein a state of the group of second neuromorphic states is reflected by a refractory period counter, and the time-step-activated circuitry is further to:
set the refractory period counter to a maximum counter value upon generation of an outgoing data signal for the second group of neuromorphic states; and
decrement the refractory period counter responsive to each time step update signal, wherein the time-step-activated circuitry is to block generation of a subsequent outgoing data signal and the signal-activated circuitry is to block adding a weight value of a subsequent incoming data signal until the refractory period counter reaches zero.

6. The integrated circuit of claim 1, wherein the time-step-activated circuitry is further to:
multiply the first membrane potential of the selected group of neuromorphic states with a leak factor to generate a first updated membrane potential; and
responsive to the first membrane potential being less than the threshold value, replace the first membrane potential with the first updated membrane potential.

7. The integrated circuit of claim 6, wherein the time-step-activated circuitry is further to:
compare an input data value of the selected group of neuromorphic states with a pseudo- randomly-generated input signal threshold; and
responsive to the input data value being greater than the pseudo-randomly-generated input signal threshold, add the input data value to the first updated membrane potential before replacing the first membrane potential with the first updated membrane potential.

8. The integrated circuit of claim 6, wherein the time-step-activated circuitry is further to:
compare a bias value for the selected group of neuromorphic states with a pseudo- randomly-generated input bias threshold; and
responsive to the bias value being greater than the pseudo-randomly-generated input bias threshold, add the bias value to the first updated membrane potential before replacing the first membrane potential with the first updated membrane potential.

9. A system comprising:
a memory block;
a computation block; and
a router coupled to the memory block and to the computation block,
wherein the computation block comprises:
a time step controller to randomly activate a time step update signal for performing a randomly time-multiplexed selection of a group of neuromorphic states to update;
a time-step-activated circuitry coupled to the time step controller and to, responsive to detecting the time step update signal for a selected group of neuromorphic states:
generate an outgoing data signal in response to determining that a first membrane potential of the selected group of neuromorphic states exceeds a threshold value, wherein the outgoing data signal includes an identifier that identifies the selected group of neuromorphic states and a memory address, wherein the memory address corresponds to a location in the memory block, and
update a state of the selected group of neuromorphic states in response to generation of the outgoing data signal; and
a learning unit coupled to the time step controller and to, responsive to detecting no time step update signal and to receipt of an incoming data signal, perform a learning operation by:
identifying a second group of neuromorphic states corresponding to an identifier retrieved from the incoming data signal, and
updating a weight value of the incoming data signal, to generate an updated weight value to be provided to the router, for storage at a second memory address of the memory block, wherein the learning unit is separate from the time-step-activated circuitry.

10. The system of claim 9, further comprising a register set to store the selected group of neuromorphic states and the second group of neuromorphic states, wherein the computation block further comprises a signal-activated circuitry to, responsive to receipt of the incoming data signal:
identify a register, within the register set, for the second group of neuromorphic states;
retrieve, from the register, a second membrane potential for the second group of neuromorphic states;
add the weight value of the incoming data signal to the second membrane potential of the second group of neuromorphic states, to generate an updated second membrane potential; and
store the updated second membrane potential back to the register set.

11. The system of claim 10, wherein the register set comprises a first register set to store a first subset of the group of second neuromorphic states accessed by the signal-activated circuitry, and a second register set to store a second subset of the group of second neuromorphic states that are also accessed by the time-step-activated circuitry.

12. The system of claim 10, wherein a state of the group of second neuromorphic states is reflected by a learning counter, and the time-step-activated circuitry is further to:
set the learning counter to a maximum counter value upon generation of an outgoing data signal for the second group of neuromorphic states;
decrement the learning counter responsive to each time step update signal; and wherein the learning counter is further to trigger selection of a weight update value to one of add to or subtract from the weight value, to generate the updated weight value.

13. The system of claim 9, wherein the time-step-activated circuitry is further to:
   multiply the first membrane potential of the selected group of neuromorphic states with a leak factor to generate an updated first membrane potential; and
   responsive to the first membrane potential being less than the threshold value, replace the first membrane potential with the updated first membrane potential.

14. A system comprising a plurality of cores, wherein a first core of the plurality of cores comprises:
   a register set to store multiple groups of neuromorphic states; and
   a time step controller comprising:
      a linear-feedback shift register (LFSR) to pseudo-randomly generate a first value at a time step defined by a plurality of clock cycles; and
      a cellular automaton (CA) coupled to a second CA of a second core and to a third CA of a third core of the plurality of cores, wherein the CA is to:
         pseudo-randomly generate a second value different than values generated by the second CA and the third CA; and
         store the second value into a CA register coupled to the CA; and
      an exclusive OR (XOR) to combine the first value with the second value to generate an updated value; and
      a comparator to:
         compare a sequencing portion of the updated value with a programmable scan value; and
         activate a time step update signal responsive to the sequencing portion matching the programmable scan value, the time step update signal to select a group of neuromorphic states of the multiple groups of neuromorphic states.

15. The system of claim 14, wherein the group of neuromorphic states has an address provided by an address portion of the updated value, wherein the address corresponds to a location within a register set for storing the group of neuromorphic states.

16. The system of claim 15, wherein the time step controller further comprises clock gating of the CA register controlled by a pseudo-random bit, to ensure the LFSR proceeds through a plurality of available pseudo-random states for the second value stored in the CA register.

17. An integrated circuit comprising a core for updating multiple groups of neuromorphic states, the core comprising:
   a register set to store the multiple groups of neuromorphic states;
   an address generator to identify a group of neuromorphic states, of the multiple groups of neuromorphic states, corresponding to an identifier retrieved from an incoming data signal;
   a first multiplexer coupled to the address generator, the first multiplexer to retrieve a weight update value corresponding to a learning counter value stored in the register set for the group of neuromorphic states, wherein the weight update value is also based on an incoming learning message type;
   a lookup table to store a learning control state comprising a set of learning control bits, wherein the learning control state is selected from a group comprising long-term depression (LTD), long-term potentiation (LTP), and event-driven contrastive divergence (CD);
   a sign extender coupled to the first multiplexer, the sign extender to perform a sign extension to the weight update value to generate a sign-extended weight update value;
   a second multiplexer coupled to the sign extender, to the first multiplexer, and to the lookup table, the second multiplexer to select one of the weight update value or the sign-extended weight update value depending on the learning control state of the set of learning control bits, to generate a weight change value; and
   an adder coupled to the second multiplexer, the adder to add the weight change value to a weight value of the incoming data signal, to generate an updated weight value for the group of neuromorphic states, wherein the core is to provide the updated weight value to a router to be stored in an associated memory block at an address of the group of neuromorphic states.

18. The integrated circuit of claim 17, wherein the incoming learning message type comprises one of LTD or LTP, and wherein the learning control state of the set of learning control bits causes one of:
   elimination of the sign-extended weight update value when the learning control bits are zero values;
   retaining the weight update value as a positive value in response to an LTP incoming learning message when the learning control bits indicate LTP;
   making the weight update value a negative value in response to an LTD incoming learning message when the learning control bits indicate LTD; or
   selecting, when the learning control bits indicate CD, one of the positive value or the negative value of the weight update value according to a plurality of modulatory bits received over a network to which the core is communicatively coupled via the router.

19. The integrated circuit of claim 18, further comprising a programmable parameter memory in which is stored a weight update curve comprising an LTD portion and an LTP portion of the weight update curve, and the core is further to:
   manipulate the weight update curve to control a ratio of LTD versus LTP learning; and
   generate selectable weight update values based on the LTD portion and the LTP portion of the weight update curve.

20. The integrated circuit of claim 17, wherein the core further comprises a weight bound checker to perform a set of maximum and minimum boundary checks on the sign-extended weight update value according to a programmable maximum weight and a programmable minimum weight.

21. The integrated circuit of claim 17, wherein the core further comprises a weight scaler to apply a weight scale to the weight update value before selectively performing the sign extension, to generate a larger weight update value.

22. The integrated circuit of claim 17, wherein the core further comprises a time step controller to activate a time step update signal that performs a time-multiplexed selection of the group of neuromorphic states of the multiple groups of neuromorphic states, and the core is to perform a learning operation when the time step update signal is not detected.

* * * * *